US008761331B2

(12) United States Patent
Kawashima et al.

(10) Patent No.: US 8,761,331 B2
(45) Date of Patent: Jun. 24, 2014

(54) CONTROL ROD FOR BOILING WATER REACTOR

(75) Inventors: Norio Kawashima, Mito (JP); Hirofumi Oizumi, Hitachi (JP); Satoru Aoike, Tokai (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 709 days.

(21) Appl. No.: 12/871,244

(22) Filed: Aug. 30, 2010

(65) Prior Publication Data

US 2011/0064182 A1    Mar. 17, 2011

(30) Foreign Application Priority Data

Sep. 11, 2009  (JP) ................................. 2009-209931

(51) Int. Cl.
*G21C 7/113*   (2006.01)
*G21C 7/00*    (2006.01)

(52) U.S. Cl.
USPC ............................ 376/333; 376/260; 376/327

(58) Field of Classification Search
USPC ......... 376/260, 327, 333, 334, 207, 219–222, 376/353, 458; 252/478; 976/DIG. 113, 976/DIG. 117, DIG. 118, DIG. 119, DIG. 123
See application file for complete search history.

(56) References Cited

U.S. PATENT DOCUMENTS 3,485,717 A  * 12/1969  Eich ............................... 376/333
4,285,769 A  *  8/1981  Specker et al. ................ 376/333
4,451,428 A  *  5/1984  Nishimura et al. ........... 376/333
4,631,165 A  * 12/1986  Wilson et al. ................. 376/333
4,655,999 A  *  4/1987  Maruyama et al. ........... 376/333
4,676,948 A  *  6/1987  Cearley et al. ................ 376/333
4,752,440 A  *  6/1988  Ahlinder et al. .............. 376/333
4,861,544 A  *  8/1989  Gordon ......................... 376/333

(Continued)

FOREIGN PATENT DOCUMENTS

JP      56-21092      2/1981
JP      01-254895    10/1989

(Continued)

OTHER PUBLICATIONS

Design Fabrication and Performance of Boron-Carbide Control Elements, by H.A. Brammer, et al. In the IAEA report (1964), "Physics and Material Problems of Reactor Control Rods".

(Continued)

*Primary Examiner* — Bernarr Gregory
(74) *Attorney, Agent, or Firm* — Antonelli, Terry, Stout & Kraus, LLP.

(57) ABSTRACT

A control rod for a boiling water reactor is provided with a structure element having mutually-perpendicular four blades. The four blades have a neutron absorber-filling region that neutron absorber is held, respectively. In the structure element, a plurality of regions formed in an axial direction of the control rod include a first region having a first cross-section that forms a first united cruciform cross-section of the four blades connected one another, a second region having a second cross-section that has each separated cross-section of the four blades, and a third region having a third cross-section that has a second united cross-section of continuous two blades of the four blades, disposed in a diametrically opposite direction and facing each other and each separated cross-section of remaining two blades of the four blades, disposed perpendicularly to the continuous two blades.

11 Claims, 23 Drawing Sheets

(56) References Cited

U.S. PATENT DOCUMENTS

| | | | | |
|---|---|---|---|---|
| 4,874,574 | A * | 10/1989 | Igarashi et al. | 376/333 |
| 4,876,060 | A * | 10/1989 | Yoshioka et al. | 376/333 |
| 4,882,123 | A * | 11/1989 | Cearley et al. | 376/333 |
| 4,888,150 | A * | 12/1989 | Vesterlund | 376/333 |
| 4,902,470 | A | 2/1990 | Dixon et al. | |
| 5,034,185 | A * | 7/1991 | Ueda et al. | 376/333 |
| 5,164,153 | A * | 11/1992 | Fukumoto et al. | 376/333 |
| 5,180,544 | A * | 1/1993 | Yoshioka et al. | 376/333 |
| 5,225,151 | A * | 7/1993 | Bernander et al. | 376/333 |
| 5,276,718 | A * | 1/1994 | Ueda | 376/333 |
| 5,592,522 | A * | 1/1997 | Holden | 376/333 |
| 5,719,912 | A * | 2/1998 | Ledford et al. | 376/327 |
| 5,742,651 | A * | 4/1998 | Anderson | 376/260 |
| 5,883,931 | A * | 3/1999 | Holden et al. | 376/327 |
| 6,041,091 | A * | 3/2000 | Ueda et al. | 376/327 |
| 6,137,854 | A * | 10/2000 | Ueda et al. | 376/333 |
| 6,205,196 | B1 * | 3/2001 | Yamashita et al. | 376/333 |
| 6,226,340 | B1 * | 5/2001 | Anderson | 376/333 |
| 6,285,728 | B1 * | 9/2001 | Ueda et al. | 376/327 |
| 6,470,061 | B1 * | 10/2002 | Helmersson | 376/333 |
| 6,510,192 | B1 * | 1/2003 | Yamashita et al. | 376/260 |
| 6,647,082 | B1 * | 11/2003 | Yamada et al. | 376/260 |
| 6,654,438 | B1 * | 11/2003 | Gotoh et al. | 376/327 |
| 6,823,035 | B1 * | 11/2004 | Helmersson et al. | 376/333 |
| 6,882,696 | B2 * | 4/2005 | Nakayama et al. | 376/327 |
| 7,469,029 | B2 * | 12/2008 | Lunden | 376/327 |
| 7,477,719 | B2 * | 1/2009 | Lunden | 376/327 |
| 8,213,563 | B1 * | 7/2012 | Arakawa et al. | 376/333 |

FOREIGN PATENT DOCUMENTS

| | | |
|---|---|---|
| JP | 02-236198 | 9/1990 |
| JP | 2002-533736 | 12/1999 |
| JP | 2009-058447 | 3/2009 |
| WO | WO 00/39808 | 7/2000 |

OTHER PUBLICATIONS

A Review of irradiation Assisted Stress Corrosion Cracking by P. Scott, Journal of Nuclear Materials 211 (1994), pp. 101-122.

Japan Nuclear Energy Safety Organization 05 Ones report -003 Report on the experimental proof of the nuclear power plant earthquake-resistant reliability, equipment load-bearing Part II (scrammability), pp. 1-1 to 1-8 (Aug. 2005) [in Japanese].

Office Action in Corresponding Japanese Application No. JP2010-202674, mailed May 7, 2013 with English language translation.

* cited by examiner

FIG. 11A
FIG. 11B
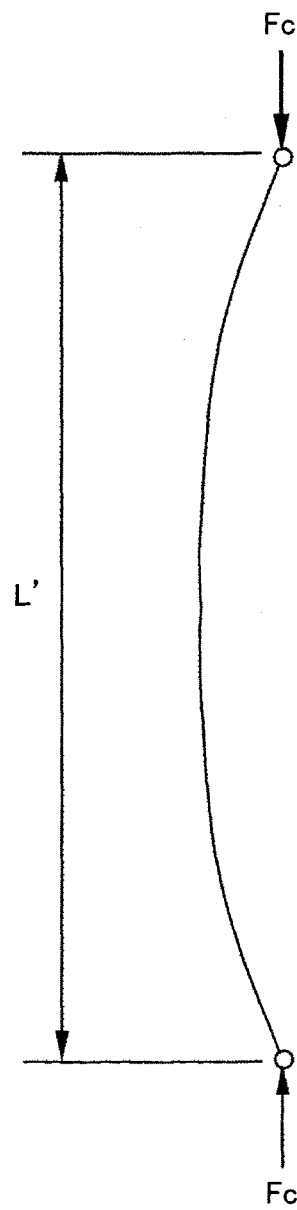
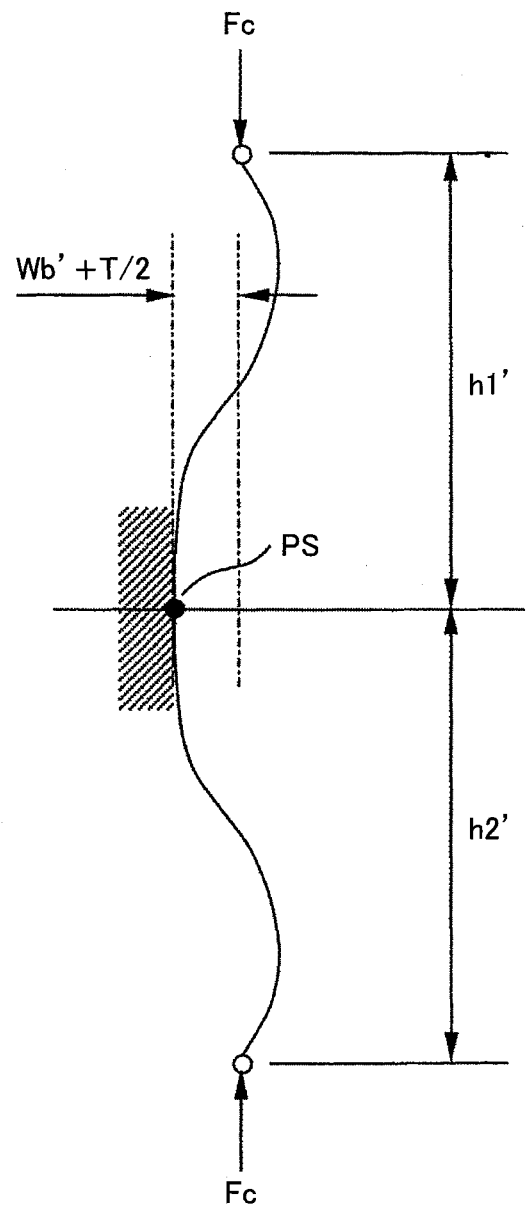

CONTROL ROD FOR BOILING WATER REACTOR

CLAIM OF PRIORITY

The present application claims priority from Japanese Patent application serial no. 2009-209931, filed on Sep. 11, 2009, the content of which is hereby incorporated by reference into this application.

BACKGROUND OF THE INVENTION

1. [Technical Field]

The present invention relates to a control rod for a boiling water reactor.

2. [Background Art]

The control rod used in a boiling water reactor has a cruciform cross-section, is disposed in the cruciform gap formed among four square-pipe-like fuel channel boxes, and inserted into and removed from a core, thereby executing start-up and shutdown of the reactor and adjusting reactor power during the reactor operation. Conventional control rods include three types of structures.

In the control rod having a first structure, a plurality of hermetically-sealed hollow tubes are disposed in parallel with one another along the central axis of the control rod having a cruciform cross-section. Those tubes extend vertically, both ends thereof are sealed by end plugs, and neutron absorber is enclosed therewithin. All of the tubes are disposed in the four control rod blades, each composed of a thin metal sheath member having a U-shaped cross-section. An upper portion member is joined to an upper end portion of a tie rod and a lower support member is joined to a lower portion of the tie rod. An upper end of the sheath member is welded to the upper portion member, and a lower end of the sheath member is welded to the lower support member. Side ends of the sheath member having the U-shaped cross-section are welded to the tie rod. The hollow tubes are disposed inside the sheath member in parallel with one another. Typical description of such the first structure is made in detail in DESIGN, FABRICATION AND PERFORMANCE OF BORON-CARBIDE CONTROL ELEMENTS by H. A. Brammer et al. in the IAEA report (1964), "Physics and Material Problems of Reactor Control Rods".

In a control rod having a second structure, solid-core metal plate members in which holes are horizontally made are used. FIG. 19 shows the second structural concept of the control rod 200. A length and a width of the metal plate member are the same as those of the control rod having the first structure. The metal plate member is provided with a plurality of horizontal holes extending from a side face of the control rod toward the center of the cruciform cross-section. In FIG. 19, horizontal holes 201 into which neutron absorber is filled exemplify those holes. Those horizontal holes 201 prescribe aligned columnar spaces for holding the neutron absorber. In the control rod having such a structure, the member provided with spaces for holding the neutron absorber also serves as a structural strength member of the control rod, making it possible to hold slightly more neutron absorber than the control rod of the first structure composed of tubes and sheath members. Typical descriptions of such the second structure have been made in detail in patent application publication No. 2002-533736.

A control rod having a third structure is provided with a plurality of tube members having a cross section of a deformed tube including four corner lobes which are disposed on a horizontal cross-section of constantly-thick side wall of a tube at intervals of 90° and useful for providing thicker sections for the tube. This control rod is provided with four blades formed by the plurality of tube members that are arranged in parallel with an axis of the control rod and welded one another, an end plug attached to each end portion of the tube members, a handle member joined to an upper end portion of the blade, and a lower portion support member joined to a lower end portion of the blade. FIG. 20 exemplifies such a structural concept.

In FIG. 20, the cylindrical tube 301 for holding neutron absorber filled in the deformed tube exemplifies an element of the aforementioned deformed tube. In the same manner as the control rod of the above second structure, in the control rod of this third structure, a member having spaces for holding the neutron absorber also serves as a structural strength member of the control rod, consequently, the member can hold slightly more neutron absorber than the control rod of the first structure composed of tubes and sheath members. The control rod of this third structure is disclosed in Japanese Patent Laid-Open No. 1(1989)-254895.

Furthermore, functions of common control rods used in boiling water reactor can be roughly classified into two types. The first type is a control rod used to shut down the reactor, which is designed to have relatively high neutron absorption reactivity worth. The second type is a control rod that is disposed at the control cell (a unit element composed of one control rod and four fuel assemblies which surround the control rod) of the reactor and is designed to adjust neutron flux distribution in the reactor thereby adjusting the reactor power.

PRIOR ART LITERATURE

Patent Literature

[Patent literature 1] Japanese Patent Laid-Open No. 1(1989)-254895

[Patent literature 2] patent application publication No. 2002-533736

Nonpatent Literature

[Nonpatent literature 1] DESIGN, FABRICATION AND PERFORMANCE OF BORON-CARBIDE CONTROL ELEMENTS by H. A. Brammer et al. in the IAEA report (1964), "Physics and Material Problems of Reactor Control Rods"

[Nonpatent literature 2] "A review of irradiation assisted stress corrosion cracking" by P. Scott, Journal of Nuclear Materials 211 (1994) 101-122

[Nonpatent literature 3] Japan Nuclear Energy Safety Organization 05 JNES report-003 Report on the experimental proof of the nuclear power plant earthquake-resistant reliability, equipment load-bearing Part II (scrammability), pp. 1-1 to 1-8 (August 2005)

SUMMARY OF THE INVENTION

Technical Problem

Recently, degradation of structural member of the practical-use control rod that is considered to be ascribed to Irradiation Assisted Stress Corrosion Cracking (IASCC) has been detected.

One case example is shown in "Publication of investigation report on cracks in the hafnium-plate type control rod used in the boiling water reactor nuclear power plant" by Nuclear and Industrial Safety Agency, Economic and Industrial Policy Bureau, May 31, 2006.

It is considered that the IASCC occurs when three factors, which are neutron fluence, applied stress, and environmental condition, are simultaneously combined. Generally, neutron fluence tends to become high toward a longitudinally upper end portion of the control rod. Furthermore, influence of residual stress exerted by welding while manufacturing the control rod is considered to be one cause of the continuously applied stress. Also, in the environmental condition, it is considered that a so-called creviced environmental condition that is formed between members facing each other at very narrow intervals in the reactor water could possibly become responsible for the IASCC.

Detailed descriptions of the IASCC are provided in "A review of irradiation assisted stress corrosion cracking" by P. Scott, Journal of Nuclear Materials 211 (1994) 101-122 and the like.

From the view point of avoiding the formation of crevice to inhibit the IASCC potential, the structures of the above second and third control rod are effective because they exclude crevices.

On the other hand, essential functions of the control rod are to be quickly scrammed into a core when any reactor operation transient event or abnormal event occurs, immediately shut down the reactor operation, and maintain the condition. Particularly, even when an enormously large earthquake occurs causing fuel assemblies to significantly deform, the control rod must immediately shut down the reactor operation and maintain the condition.

Recently, scrammability has been studied and discussed as one of main items of seismic safety evolution in the nuclear power plant with regard to seismic motion greater than the currently expected seismic motion for design.

(Reference: Japan Nuclear Energy Safety Organization 05 JNES report-003 Report on the experimental proof of the nuclear power plant earthquake-resistant reliability, equipment load-bearing Part II (scrammability), pp. 1-1 to 1-8 August 2005)

Furthermore, in July 2006, at the Kashiwazaki Kariwa Nuclear Power Station of Tokyo Electric Power Co., Inc., a seismic motion that was actually greater than the currently-expected seismic motion for design was recorded, therefore, the scrammability of the control rod is highly important as the seismic safety function in nuclear power plants.

When considering the seismic scrammability, in the control rod, flexibility is demanded. The above first structure of the control rod has good seismic scrammability because the thin-plate sheath having a U-shaped cross-section allows relatively flexible deformation. However, the second and third structures of the control rods are an integrated structure where the pressure-resisting member that holds the neutron absorber also bears the strength of the control rod structure. Accordingly, the second and third structures of the control rods are more rigid than the first structure of the control rod, and seismic scrammability tends to become worse. Consequently, in the second and third structures of the control rods, there remains substantial room for improvement in terms of the seismic scrammability.

An object of the present invention is to provide a control rod for a boiling water reactor, having good seismic scrammability, and capable of reducing degradation potential, and increasing a service life.

Solution to Problem

A feature of the present invention for achieving the above object is a control rod for a boiling water reactor, wherein four blades have a neutron absorber-filling region that neutron absorber is held, respectively and are disposed perpendicularly one another; and a plurality of regions formed in an axial direction of the control rod include a first region having a first cross-section that forms a first united cruciform cross-section of the four blades connected one another, a second region having a second cross-section that has each separated cross-section of the four blades, and a third region having a third cross-section that has a second united cross-section of continuous two blades, which are disposed in a diametrically opposite direction, of the four blades, and each separated cross-section of remaining two blades, which are disposed in a diametrically opposite direction and disposed perpendicularly to the continuous two blades, of the four blades.

Advantageous Effect of the Invention

According to the present invention, it is possible to provide a control rod which can suppress a decrease in seismic scrammability that is an important function of the control rod and achieve good scrammability when an extremely-large earthquake occurs even though the structural member of the control rod is a rigid structure in order to enable the neutron absorber-holding structure forming no crevice to avoid forming the crevice which is considered to be the cause of degradation of the structural member of the control rod associated with long-time use of the control rod.

BRIEF DESCRIPTION OF THE DRAWINGS

FIG. 11A is an explanatory drawing showing a buckling mode when an axial compressive load is added to a control rod having no support.

FIG. 11B is an explanatory drawing showing a buckling mode when an axial compressive load is added to a control rod having support disposed at a middle position the control rod in an axial direction of the control rod.

DETAILED DESCRIPTION OF THE PREFERRED EMBODIMENTS

Hereinafter, embodiments of the present invention will be described with reference to the drawings.

[Embodiment 1]

A control rod for a boiling water reactor of embodiment 1 which is a preferred embodiment of the present invention will be described with reference to FIG. 1, and FIG. 7 to FIG. 10.

Figure 21:
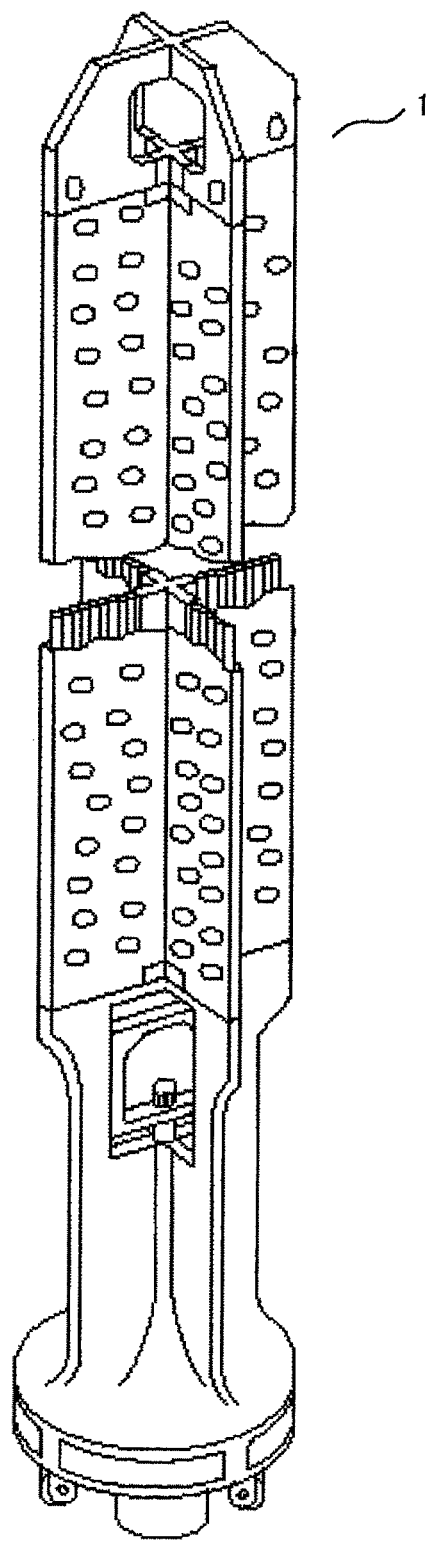
FIG. 21 is a perspective view showing a conventional control rod for a boiling water reactor, having sheathes with a U-shaped cross-section.

FIG. 21 is a perspective view showing a conventional control rod widely used in the existing boiling water reactors. As shown in FIG. 21, in the conventional control rod, mutually perpendicular blades extend from a tie rod disposed in an axial of the control rod in four directions. Each blade has a sheath which is a sheath member made of a thin stainless-steel plate having a U-shaped horizontal cross-section and both side end portions of which are mounted to the tie rod, and a plurality of neutron absorber member disposed in the sheath. The neutron absorber member is a neutron absorber rod or a metal hafnium member. The neutron absorber rod has a stainless-steel tube and boron carbide powder filled in the stainless-steel tubes. The metal hafnium directly provided in the sheath has a shape of a solid-core round rod or a tube having a flat elliptic cross-section. Furthermore, other control rod types include a type in which a structural member does not have the sheath, the tie rod, and the neutron absorber rod, but the structure member has stainless-steel plate having a cruciform cross-section and forms neutron absorber-filling region in the stainless-steel plate, and another type in which a structural member has a plurality of stainless-steel tubes, which is filled with the neutron absorber, welded one another, and forms a cruciform cross-section. In those types of the control rods, the horizontal cross-section of the region filled with the neutron absorber is basically united cruciform.

In the control rod shown in FIG. 21, hollow tubes holding the neutron absorber do not contribute to strength of the control rod structure. Furthermore, in the control rod of this structure, the thin metal sheath member constituting the control rod structure is generally provided with a plurality of cooling holes in order to introduce the reactor water into the sheath member, thereby eliminating heat generated by neutron absorption reaction of the neutron absorber included inside. Thus, a very narrow region, a so-called narrow crevice structure, tends to be farmed between an inner surface of the sheath member and an outer surface of the neutron absorber member.

Figure 2:
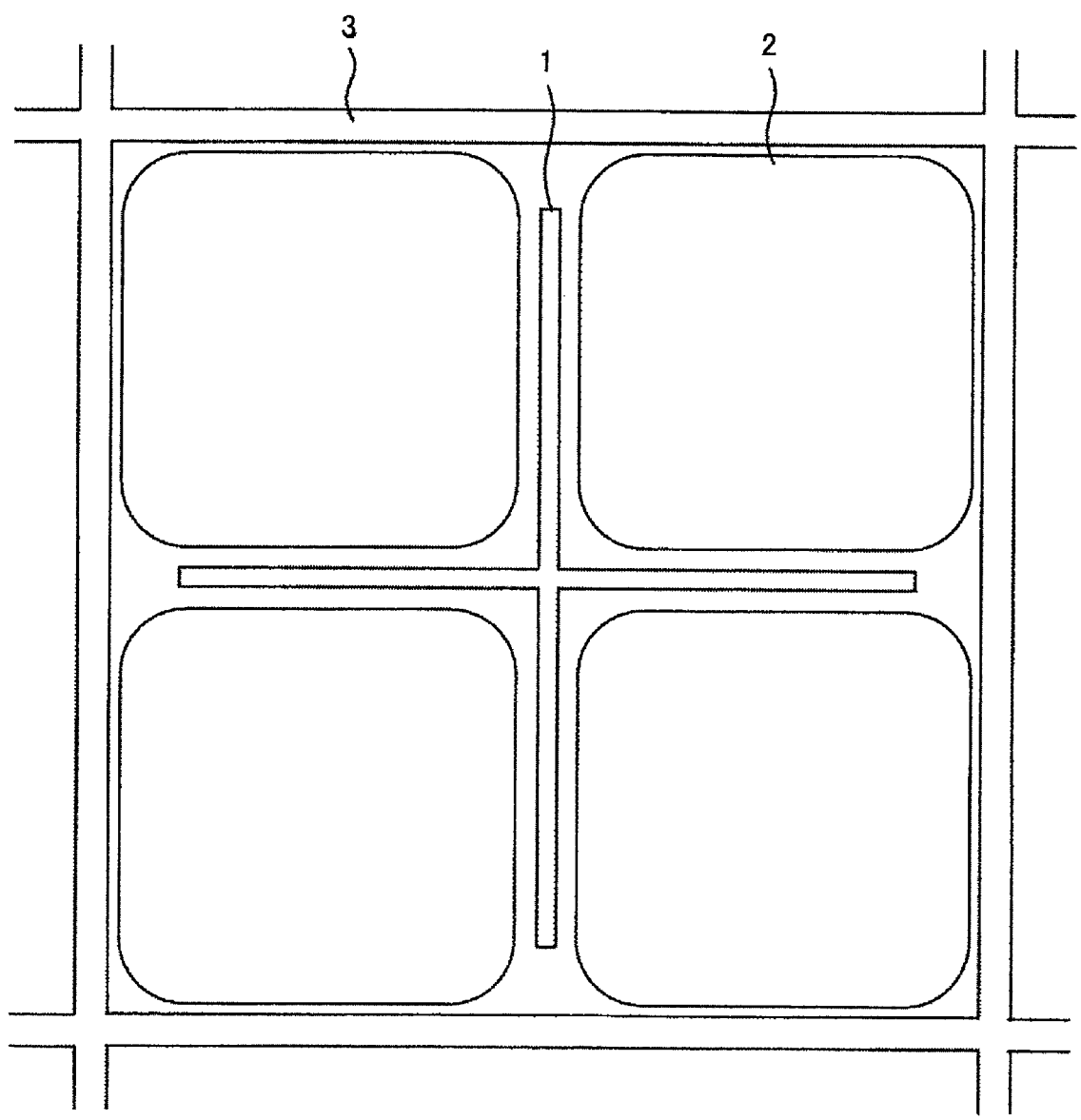
FIG. 2 is a horizontal cross-sectional view of a control cell composed of a control rod and four fuel assemblies.
Figure 3:
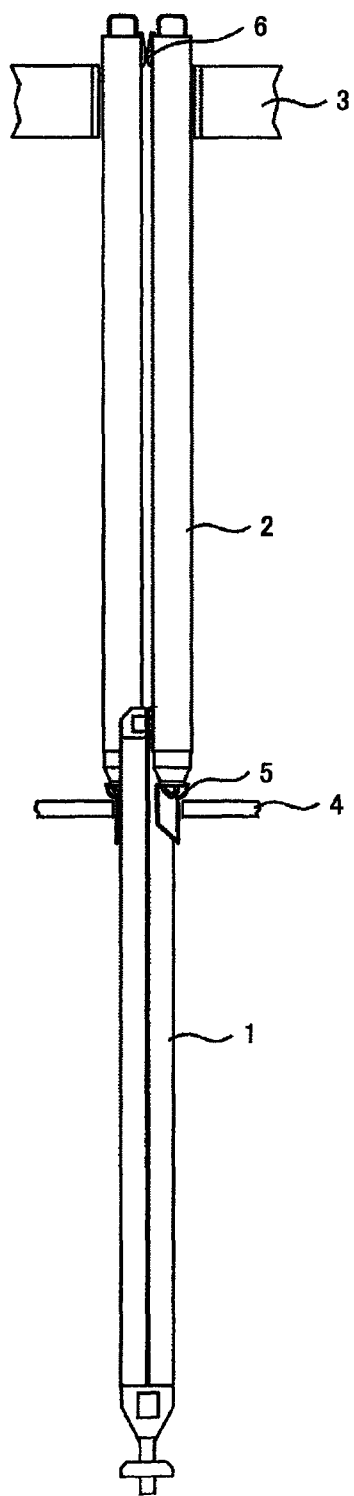
FIG. 3 is an explanatory drawing showing a state that a control rod was completely withdrawn from among fuel assemblies.

As shown in FIG. 2, a plurality of control rods 1 and fuel assemblies 2, and an upper grid 3 are disposed in the reactor. FIG. 2 shows the horizontal cross-section of the core having the cell where one control rod 1 and four fuel assemblies 2 surrounding the control rod 1 are disposed. The upper grid 3 supports a side of each upper end portion of the fuel assemblies. As shown in FIG. 3, the control rod 1 having a cruciform horizontal cross-section is disposed in water gap area formed among four fuel assemblies. The control rod 1 can be inserted into and withdrawn from the water gap formed in the core, by being guided by the outer surface of the fuel assemblies.

FIG. 3 shows a state that the control rod 1 was completely withdrawn from the core. A lower end portion of the fuel assemblies 2 is supported by an orificed fuel support 5 disposed in a core plate 4. The side of each upper end portion of the fuel assemblies is supported by the upper grid 3. The fuel assemblies in the cell are supported in a horizontal direction in the core by channel fastener 6 mounted to a top of each fuel assemblies. In this condition, the control rod 1 is inserted vertically into the core by using a control rod drive mechanism (CRD).

Figure 4:
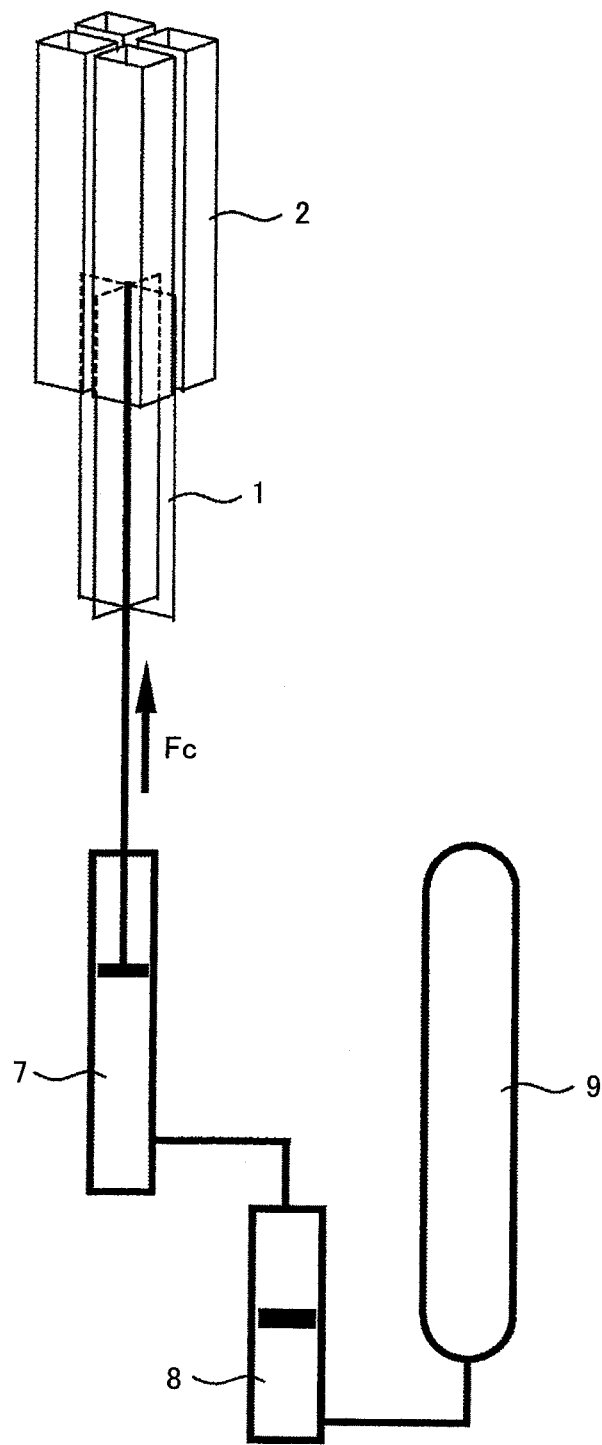
FIG. 4 is a structural diagram showing a system to quickly insert a control rod among fuel assemblies in a boiling water reactor.

FIG. 4 schematically shows a scramming mechanism for scramming the control rods 1 into the core in the event something abnormal detected during reactor operation. The control rod drive mechanism 7 which hydraulically drives the control rod 1 is coupled with a lower end portion of the control rod 1 located among four fuel assemblies 2 disposed in the cell. The control rod drive mechanism 7 is connected by a pipe to an accumulator 8 which is a water-pressure reserve apparatus intended to provide water pressure. The accumulator 8 is connected by the pipe to an accumulator gas vessel 9 filled with nitrogen gas to discharge high-pressure water. A hydraulic control unit (HCU) has the accumulator 8 and the accumulator gas vessel 9. The scram pilot valve that operates by detecting an abnormal signal is provided in the pipe connecting the accumulator 8 and the accumulator gas vessel 9. When something abnormal is detected during the reactor operation, the scram pilot valve opens, and then, nitrogen gas existing inside the accumulator gas vessel 9 flows into the accumulator 8. Water stored in the accumulator 8 flows into the control rod drive mechanism 7 by the supply of the nitrogen gas, and then the control rods 1 are scrammed into the core. Thus, the reactor is shut down and all of the control rods 1 are kept scrammed in the core. Fc shown in FIG. 4 indicates a scram drive force for descriptive purposes. The scram drive force Fc can be expressed by equation (1).

$$Fc=P \times A=m \times \alpha + m \times g + Ffr + Fd \quad (1)$$

Herein, Fc is scram drive force, P is water pressure in the accumulator, A is pressure receiving area of a drive axis, m is control rod mass, α is acceleration, g is gravity acceleration, Ffr is friction force applied to a drive piston (not shown) which is connected the control rod 1, of the control rod drive mechanism 7, and Fd is fluid resistance applied to the drive piston.

Figure 5:
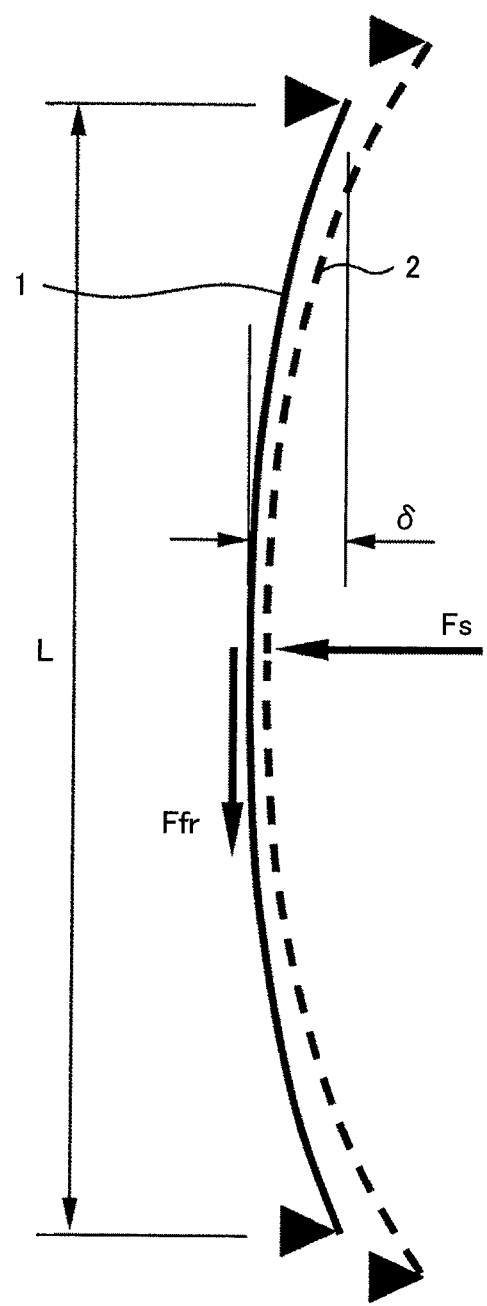
FIG. 5 is an explanatory drawing showing schematically a state that a control rod and fuel assemblies in a boiling water reactor were become deformed by horizontal seismic load while all of the control rods are scrammed among the fuel assemblies.

Abnormalities to be detected include seismic motions. Even when an earthquake occurs, all of the control rods 1 must be scrammed among the fuel assemblies while being subject to the resistance due to the deformation of shaking fuel assemblies, and must maintain the scramming condition. Furthermore, the time duration until the scramming operation is completed must be within the time duration in which transient events associated with the earthquake can be suppressed. As shown in FIG. 3, since the fuel assembly is an axially long, square tube that is merely supported by the upper grid 3 at the upper end portion thereof and by the orificed fuel support 5 at the lower end portion thereof, a seismic force causes the fuel assembly 2 to deform in the sinusoidal shape with the upper and lower end portions supported as shown in FIG. 5. FIG. 5 shows a state in which all of the control rods 1 have been scrammed among fuel assemblies 2 that deform due to a seismic force. The control rod 1 also deforms with sliding members provided at the upper and lower end portions as being supporting points. Deformation of the fuel assemblies 2 and the control rod 1 due to an earthquake can be considered equivalent to balanced seismic load Fs of a beam with the upper and lower end portions as being supporting points. When the control rod 1 is inserted, the friction force Ffr acts perpendicularly to the balanced seismic load Fs.

Moreover, when an earthquake occurs, seismic acceleration acts on the member mass as a force of inertia as well as a balanced load due to the interference between the fuel assemblies and the control rods. However, the seismic acceleration is ignored herein to simplify the description of the effect of the present invention.

Equation (1) has the Ffr term that is a friction force exerted on the drive system. When an earthquake occurs, the friction force Ffr between the control rods and the fuel assemblies included in the Ffr term increase quickly. In equation (1), the scram drive force Fc, control rod mass m and gravity acceleration g remain unchanged, and relative ratio of the fluid resistance Fd exerted on the drive system is considered low. Therefore, an increase in the seismic friction force between the control rods and the fuel assemblies causes kinetic force $m \times \alpha$ of the control rods to decrease, worsening the scrammability.

Figure 6:
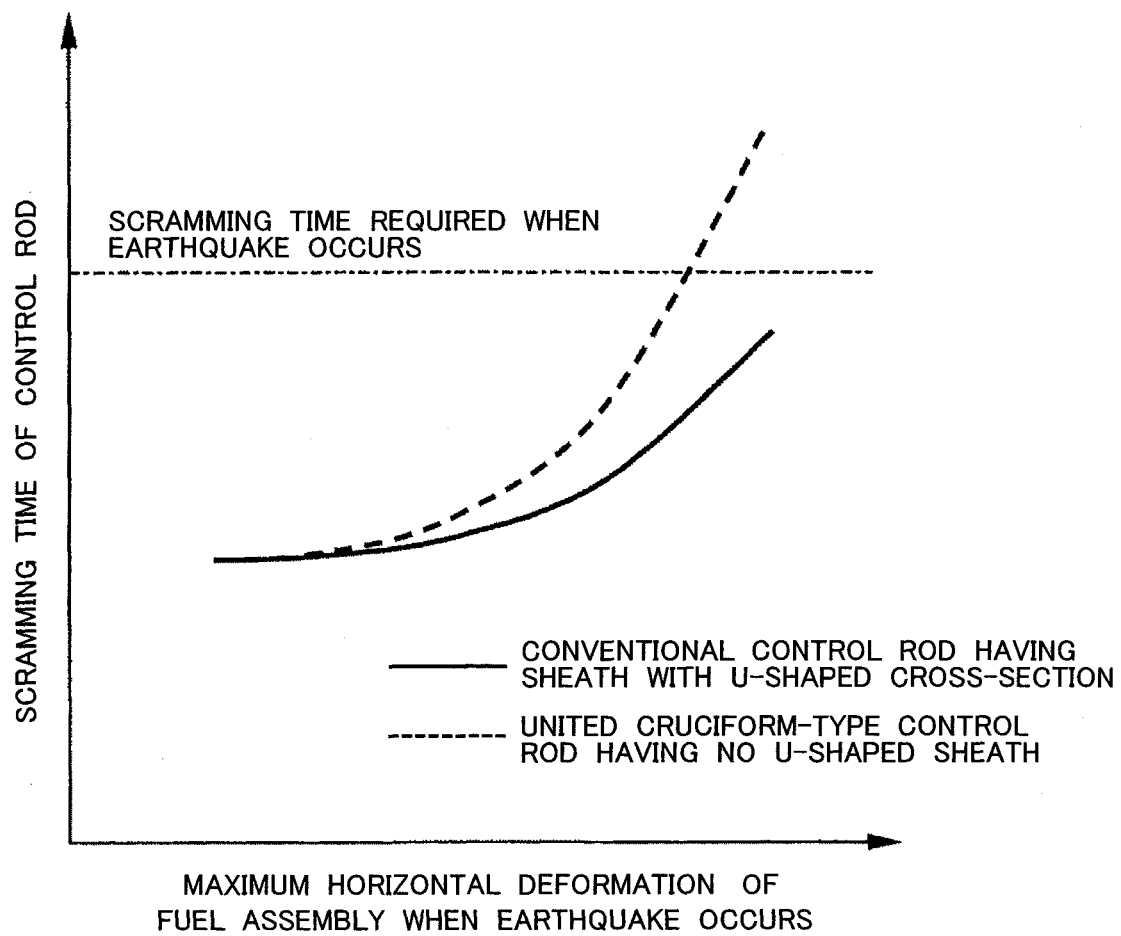
FIG. 6 is a characteristic drawing showing a relationship between maximum horizontal deformation of fuel assembly when earthquake occurs and scramming time of a control rod on conventional control rod having a sheath with a U-shaped cross-section and a united cruciform-type control rod having no U-shaped sheath.

FIG. 6 qualitatively shows the scrammability of the control rods during seismic motions, which has been obtained by scramming tests using a full-scale testing body. A lateral axis represents maximum horizontal seismic deformation of fuel assemblies and a longitudinal axis represents scramming time. When deformation of fuel assemblies is small, impact on the scrammability is low, however, if the deformation of fuel assemblies exceed a certain level, scrammability tends to quickly become worse. Specifically, in comparison with the conventional control rod having sheaths with a U-shaped cross-section, a united cruciform-type control rod where no U-shaped sheath is provided and the neutron absorber-holding function also serves as a structural member that has high bending rigidity. Accordingly, if horizontal seismic deformation of the fuel assemblies increases, the scramming time significantly delays, and when a seismic motion greater than a certain level is assumed, scramming time required when an earthquake occurs may not be satisfied.

The balanced seismic load Fs of the control rod 1 and the fuel assemblies 2 in FIG. 5 can be considered that a perpendicular load Fs is exerted on a center of the simple support beam of the upper end portion of the control rod 1.

Because perpendicular load on the simple support beam is primarily proportional to section secondary moment Icr of the control rod 1, the balanced seismic load Fs of the control rod having high bending rigidity (the product of the section secondary moment and longitudinal elastic modulus of the member) becomes high, causing the seismic scrammability to become worse. Material that has been practically used in the reactor as a structure member of the control rod is stainless steel. Excluding special cases, it is indicated that when adjustment of longitudinal elastic modulus of the member is difficult, the section secondary moment of the control rod directly affects the seismic scrammability of the control rod.

Figure 22:
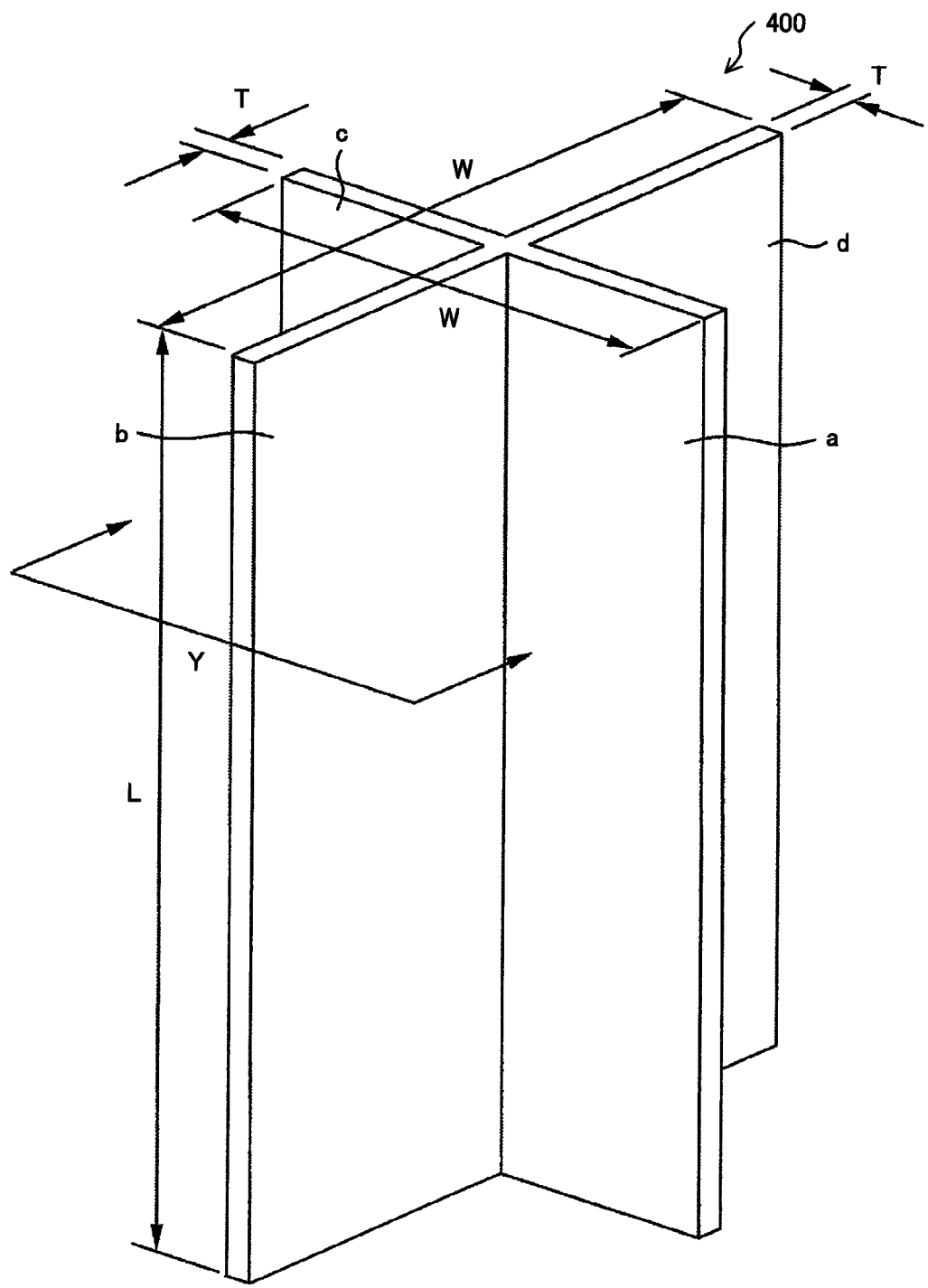
FIG. 22 is a perspective view showing a structure element of a conventional control rod for a boiling water reactor, having a cruciform horizontal cross-section.
Figure 23:
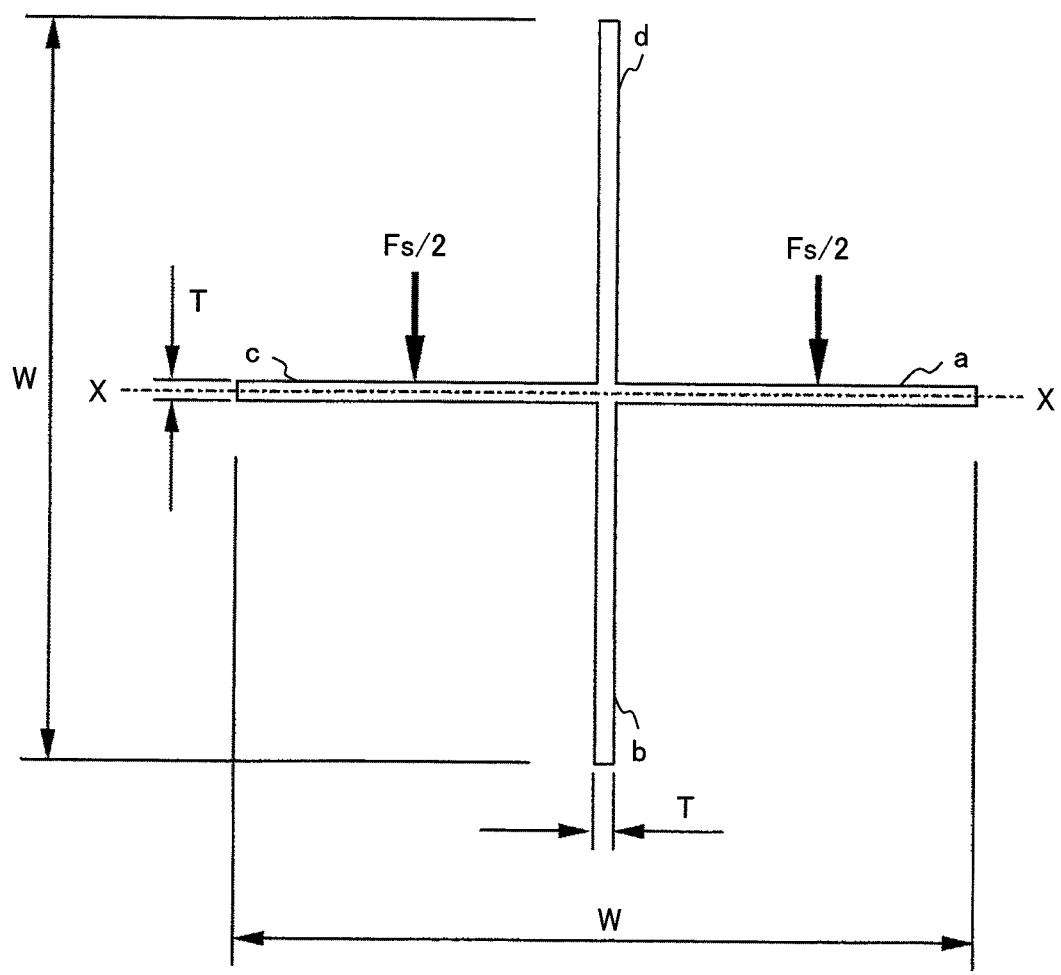
FIG. 23 is sectional view taken along a direction of arrow Y of FIG. 22.

FIG. 22 shows a neutron absorber-filling region of the conventional common control rod having a cruciform cross-section, shown in FIG. 2. In the conventional common control rod, the neutron absorber-filling region also serves as a structural member that withstands pressure and external force, and the neutron absorber-filling region has a structure without crevice to prevent material degradation during the reactor operation. The united-type control rod has blades a, b, c and d. FIG. 23 shows a horizontal cross-section viewed along a direction of arrow Y in FIG. 22. In FIG. 22, let the blades which are subject to the reaction force due to seismic deformation of fuel assemblies be blade a and blade c. In this case, the section secondary moment Io is with regard to a X-X axis in FIG. 11 and can be expressed by equation (2).

$$Io=(TW^3/12)+2[(W-T)/2]T^3/12] \quad (2)$$

In equation (2), a right hand first term is based on a cross-section of blades b-d in FIG. 23 and a right hand second term is based on a cross-section of blades a-c in FIG. 23. According to the shape of the control rod for the boiling water reactor, the ratio is nearly $T/W \approx 1/25$, and contribution of the cross-section of blades b-d to the section secondary moment Io expressed by equation (2) is as indicated in equation (3).

$$(TW^3/12)/Io \approx 0.998 \quad (3)$$

That is, the section secondary moment of the control rod blades parallel to the reaction force exerted by fuel assemblies when an earthquake occurs significantly contributes to the section secondary moment of the united cruciform cross-section shown in FIG. 23. Therefore, inventors found that the seismic scrammability can be effectively improved by separating blades a-c from blades b-d in a state shown in FIG. 23.

Figure 1:
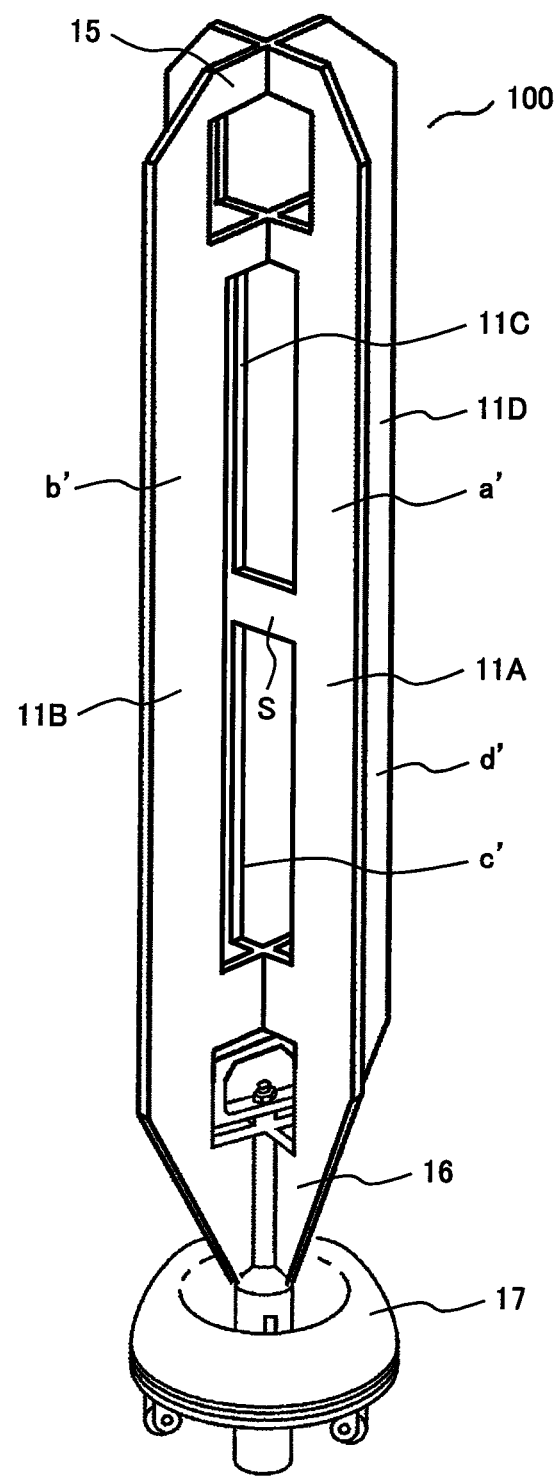
FIG. 1 is a perspective view showing a control rod for a boiling water reactor according to Embodiment 1 which is a preferred embodiment of the present invention.

The control rod 100 of the present embodiment shown in FIG. 1 is provided with the structure element 103, a handle 15, a lower support member 16 and a velocity limiter 17. The handle 15 is attached to an upper end of the structure element 103, and the lower support member 16 is attached to a lower end of the structure element 103. The velocity limiter 17 is mounted to a lower end portion of the lower support member 16.

Figure 7:
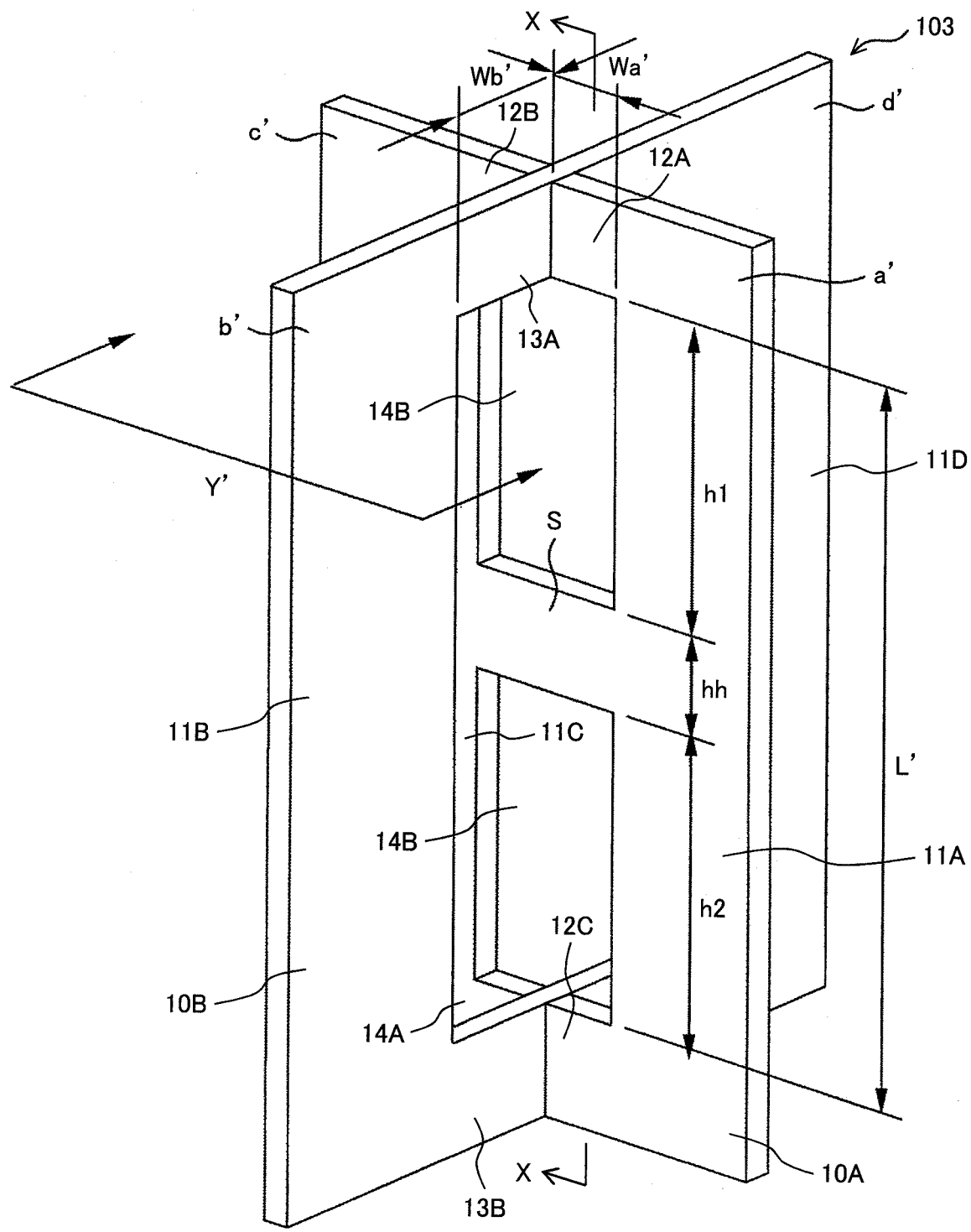
FIG. 7 is an enlarged perspective view showing a structural element of a control rod shown in FIG. 1.
Figure 8:
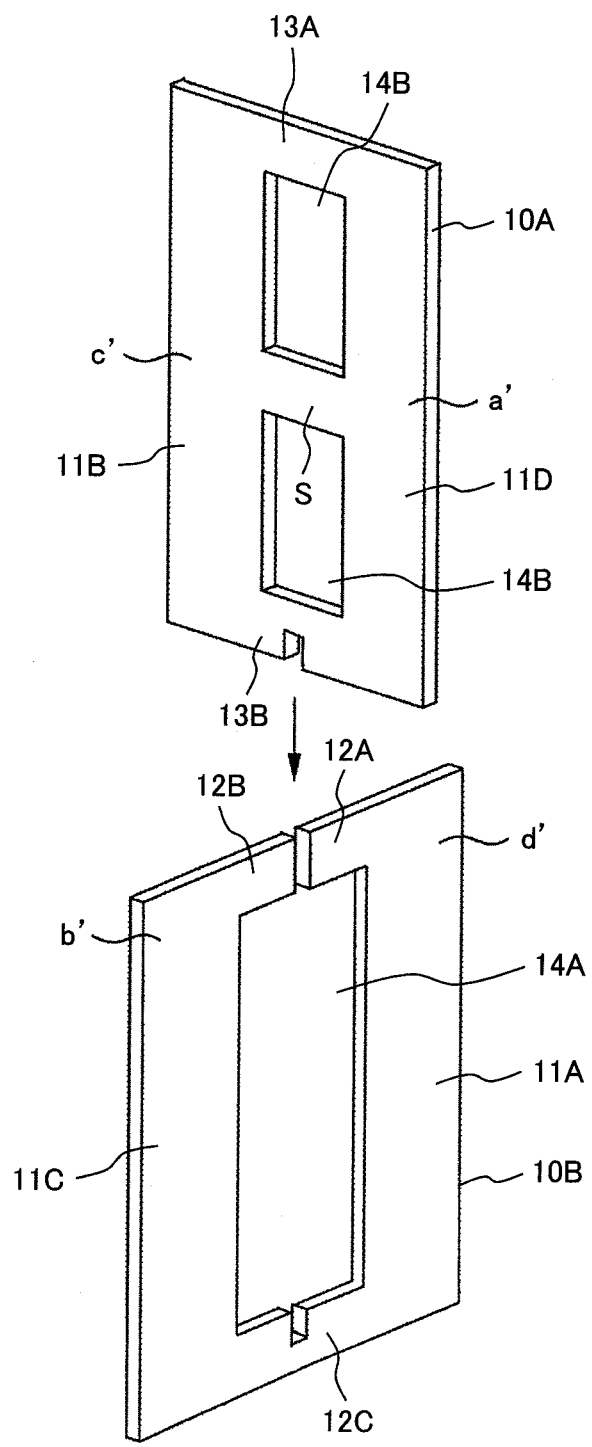
FIG. 8 is an explanatory drawing showing a manufacturing example of a structural element shown in FIG. 7.

The structure element 103 will be described in detail with reference to FIG. 7. The structure element 103 has two plate members 10A and 10B. The plate member 10A forms tow windows (opening portions) 14B and has connection portion 13A and 13B and a cross-link S as shown in FIGS. 7 and 8. The plate member 10B forms a window (an opening portion) 14A and has connection portion 12A, 12B and 12C as shown in FIGS. 7 and 8. A gap communicated with the window 14A is formed between the connection portion 12A and the connection portion 12B. The plate member 10A forms the blades a' and c' and the plate member 10B forms the blades b' and d'.

An example of manufacturing the structure element 103 is shown in FIG. 8. Herein, the plate member 10A forming the blades a' and c' is cut out from one plate, the plate member 10B forming the blades b' and d' is also cut out from one plate, the plate member 10A is then fit into the plate member 10B, and the intersecting portions are welded to form the structure element 103. The connection portion 12C is connected to the connection portion 13B by the welding and the connection portions 12A and 12B are also connected to the connection portion 13A by the welding as shown in FIG. 7. A neutron absorber-filling portion 11A is formed in the blade a'. A neutron absorber-filling portion 11B is formed in the blade b'. A neutron absorber-filling portion 11C is formed in the blade c'. A neutron absorber-filling portion 11D is formed in the blade d'. In present embodiment, the neutron absorber held in the neutron absorber material-filling portions 11A, 11B, 11C and 11D may be contained in hollow tubes, or internal holes formed in the neutron absorber-filling portions 11A, 11B, 11C and 11D may be filled with the neutron absorber. A width of the blades a', b', c' and d' is WB, respectably (see FIG. 10).

Figure 9:
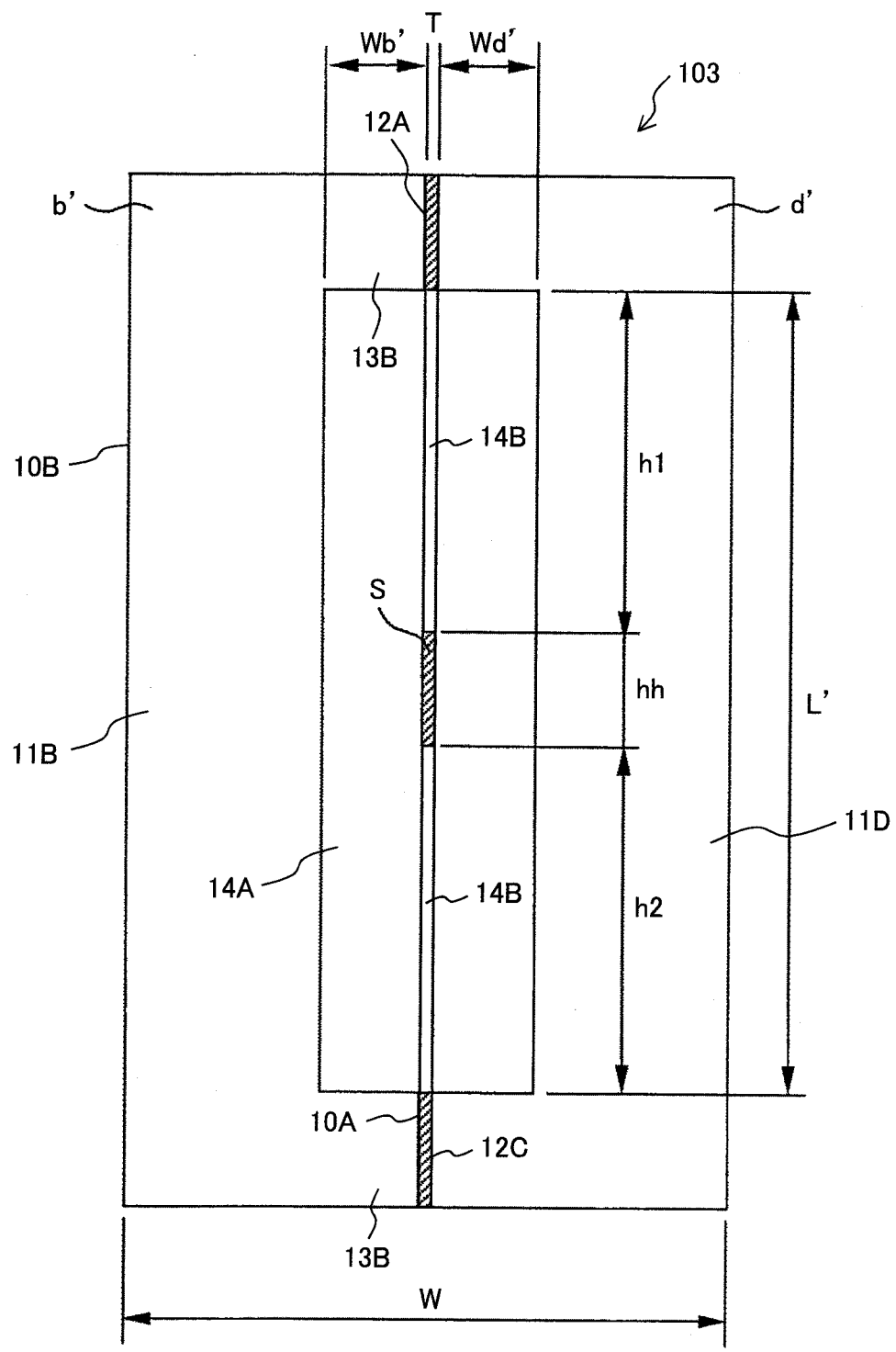
FIG. 9 is sectional view taken along a line X-X of FIG. 7.
Figure 10:
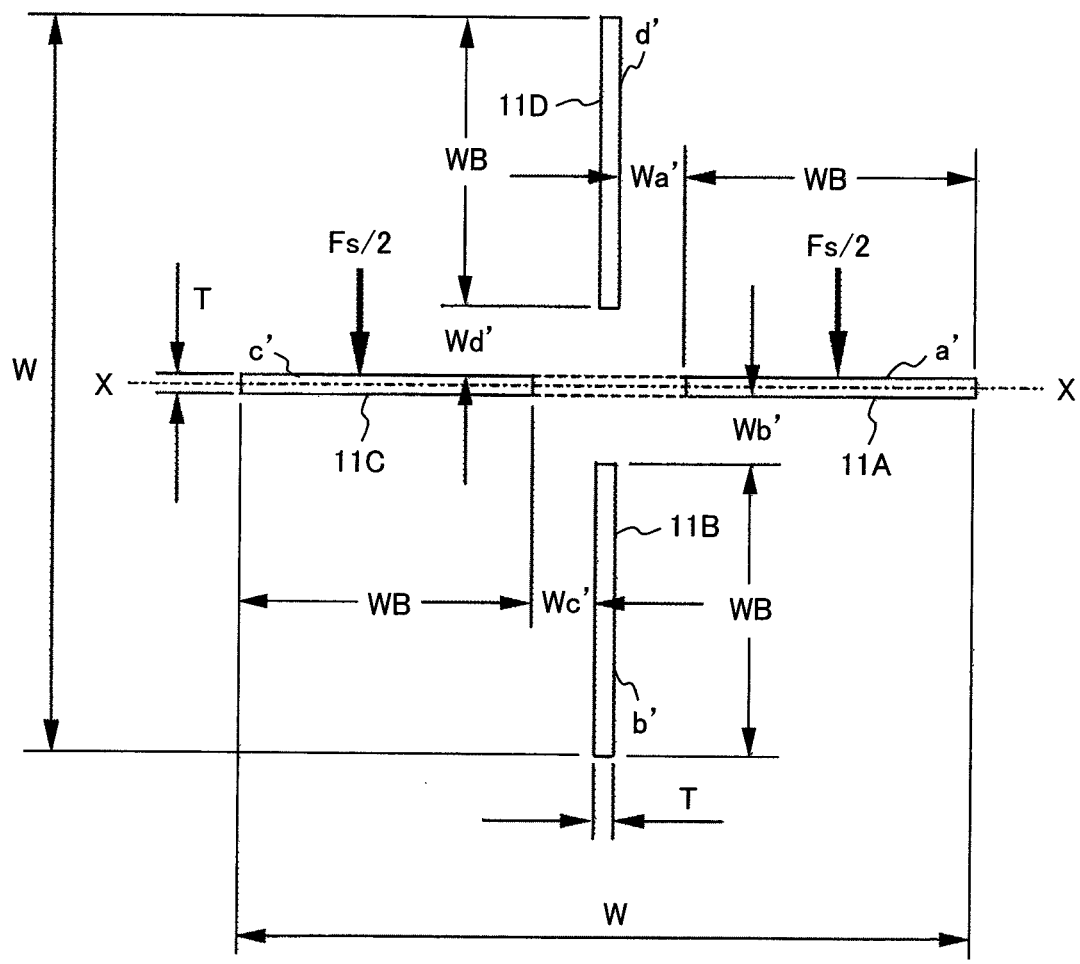
FIG. 10 is sectional view taken along a direction of arrow Y' of FIG. 7.

FIG. 7 is an enlarged perspective view showing the structural element 103. FIG. 9 is sectional view taken along a line X-X of FIG. 7. FIG. 10 is sectional view taken along a direction of arrow Y' of FIG. 7.

In FIG. 7, a height of each effective axial region that includes the neutron absorber in the neutron absorber-filling portions 11A, 11B, 11C and 11D is L'. Here, the "effective" means that the region is not particularly accurate for in-depth evaluation, but may be allowed to be used to explain this principle and effects thereof. The L' includes a height h1 region (a second region) of the upper window 14B, a height hh region (a third region) disposing the cross-link S and a height h2 region (the second region) of the lower window 14B in the plate member 10A. A height of the window 14A formed in the plate member 10B is the L'. The height h1 region and the height h2 region have independent cross-sections where the blade a' (0° blade), the blade b' (90° blade), the blade c' (180° blade) and the blade d' (270° blade) are separated from one another as shown in FIG. 10. A width of the window 14B in a width direction of the blade a' has a width that is obtained by adding a measuring Wa' between the blade a' and a mutually perpendicular blade (the blades b' and d'), a measuring Wc' between the blade c' and a mutually perpendicular blade (the blades b' and d') and a thickness of the blade b' (or the blade d') together. A width of the window 14A in a width direction of the blade b' has a width that is obtained by adding a measuring Wb' between the blade b' and a mutually perpendicular blade (the blades a' and c'), a measuring Wd' between the blade d' and a mutually perpendicular blade (the blades a' and c') and a thickness of the blade a' (or the blade c') together.

In the third region, a ratio of the measuring (distance) Wb' between the cross-link S and the blade c' to the width WB of the blade is 2/25 or less and a ratio of the measuring (distance) Wd' between the cross-link S and the blade d' to the width WB of the blade is also 2/25 or less.

The neutron absorber-filling portions 11A of the blade a' and the neutron absorber-filling portions 11C of the blade c' are placed in a diametrically opposite direction. The window 14A is formed between the neutron absorber-filling portions 11A and the neutron absorber-filling portions 11C, and the neutron absorber-filling portion 11A mutually faces the neutron absorber-filling portion 11C. The neutron absorber-filling portions 11B of the blade b' and the neutron absorber-filling portions 11D of the blade d' are placed in a diametrically opposite direction. The window 14B is formed between the neutron absorber-filling portions 11B and the neutron absorber-filling portions 11D, and the neutron absorber-filling portion 11B mutually faces the neutron absorber-filling portion 11D.

Furthermore, in FIG. 7, the cross-link S is placed at the height hh region and connected between the neutron absorber-filling portion 11A and the neutron absorber-filling portion 11D. In the height hh region, a continuous united cross-section (a second united cross-section) is formed by uniting the blade a' and the blade c' through the cross-link S. On the other hand, in the height of the continuous united cross-section, the blades b' and d' are separated. Furthermore, in the same manner as the conventional control rod structure, each horizontal cross-section of the regions above and below the effective axial region L' is a cruciform structure where four blades are unified as shown in FIG. 23. The structure element 103 of the control rod 100 of the present embodiment has three different types of cross-sections, that is, a first cross-section that forms a completely united cruciform cross-section composed of mutually-perpendicular four blades below and above the effective axial region L', a second cross-section that has each separated cross-section of completely independent four blades in the height h1 region and the height h2 region, a third cross-section that has a united cross-section composed of continuous two blades disposed in a diametrically opposite direction and facing each other and each separated cross-section of two independent blades perpendicularly to the continuous two blades in the height hh region.

That is, the control rod 100 has a first region having the first cross-section, the second region having the second cross-section and the third region having the third cross-section. A region disposing the connection portions 12A and 13A and a region disposing the connection portions 12C and 13B are the first region, respectively. A region forming the window 14B is the second region. A region forming the window 14A is also the second region. A region disposing the cross-link S is the third region. The connection portions 12A and 13A, and the connection portions 12C and 13B is a cruciform connection member, respectively.

By applying the first cross-section, if the blades a' and c' are subject to the load exerted by fuel assemblies when an earthquake occurs, the blades a' and c' move independently of the blades b' and d' until they deform by the amount of a width Wb' of the window 14A provided in blade b'. Therefore, only the section secondary moment of the blades a'-c' can be considered as rigidity, and the contribution thereof is a remaining portion of the contribution ratio shown in equation (2), that is nearly 0.002. Consequently, it is possible to significantly improve the seismic scrammability.

These ratio are also applied to later embodiments 2, 3 and 4.

Next, the function of the cross-link S shown in FIG. 7 will be described. When focusing only on the improvement of the aforementioned seismic scrammability, it is not particularly necessary to provide the cross-link S, but all of the mutually perpendicular blades a', b', c', and d' in the cruciform shape may be independent. Herein, other than an earthquake, the scramming force, shown in FIG. 5, that occurs at the time of scramming significantly acts on the control rod. At the beginning of scramming, the scramming force exerts a compressive load Fcomp, as indicated in equation (4), on the control rod 100 as a force of inertia.

$$F{\rm comp}=m\times(Fc/m)=Fc \qquad (4)$$

According to Euler's formula of critical buckling load, in the same manner as the bending rigidity, the critical buckling load is primarily proportional to the section secondary moment. Therefore, if the effective section secondary moment of the control rod is simply intended to be reduced in order to improve seismic scrammability, the inertia load at the scramming could possibly exceed the critical buckling load of the control rod. FIGS. 11A and 11B schematically show a buckling mode in which an axial compressive load is exerted on the control rod. FIG. 11A shows the buckling mode in which the length L' of the effective axial region has no support therearound and an upper limit end portion is simply supported. FIG. 11B shows the buckling mode in which a rigid support point PS is provided at a longitudinal center position of the length L' so that the length L' can be equally divided into a height h1' of the upper window 14B and a height h2' of the lower window 14A. According to Euler's formula of the critical buckling load, the critical buckling load is inversely proportional to the square of object length L'. Accordingly, by providing the central support point PS shown in FIG. 11B, the buckling length shown in FIG. 11B becomes half of the buckling length in FIG. 11A, enabling the buckling load to be reduced to one-quarter. Furthermore, in the buckling condition in FIG. 11B, since a contact point PS is a fixed support, the effective buckling length is reduced to approximately 70% of a both-end simple support condition, and thus, the buckling load can be reduced to one-quarter or less of the buckling load in FIG. 11A. The structure intended to obtain the central support point PS is the cross-link S shown in FIG. 7. The height of the cross-link S shown in FIG. 7 is hh, and a center position of this height, hh/2, corresponds to contact point PS in FIG. 11B. Moreover, when the blades a' and c' of the structure shown in FIG. 7 buckle in the mode shown in FIG. 11B, the cross-link S is formed to move by the amount of width the Wb'+T/2 of the window 14A provided in the blade b' and then stop and remain.

If a ratio of width Wb'+T/2 of the window 14A provided in the blade b' to the effective length L' can be made sufficiently small, for example, one-twentieth which is nearly half of the ratio of the width of the tie rod to the length in the axial direction, of the neutron absorber-filling region in the existing conventional control rod, bending stress caused by deformation is small. Accordingly, if a momentarily vanishing load, such as a load at the start of scramming, is exerted, it is possible to quickly return to the initial condition. On the other hand, the presence of the cross-link S restricts the reduction of the section secondary moment in the aforementioned cruciform cross-section.

Figure 12:
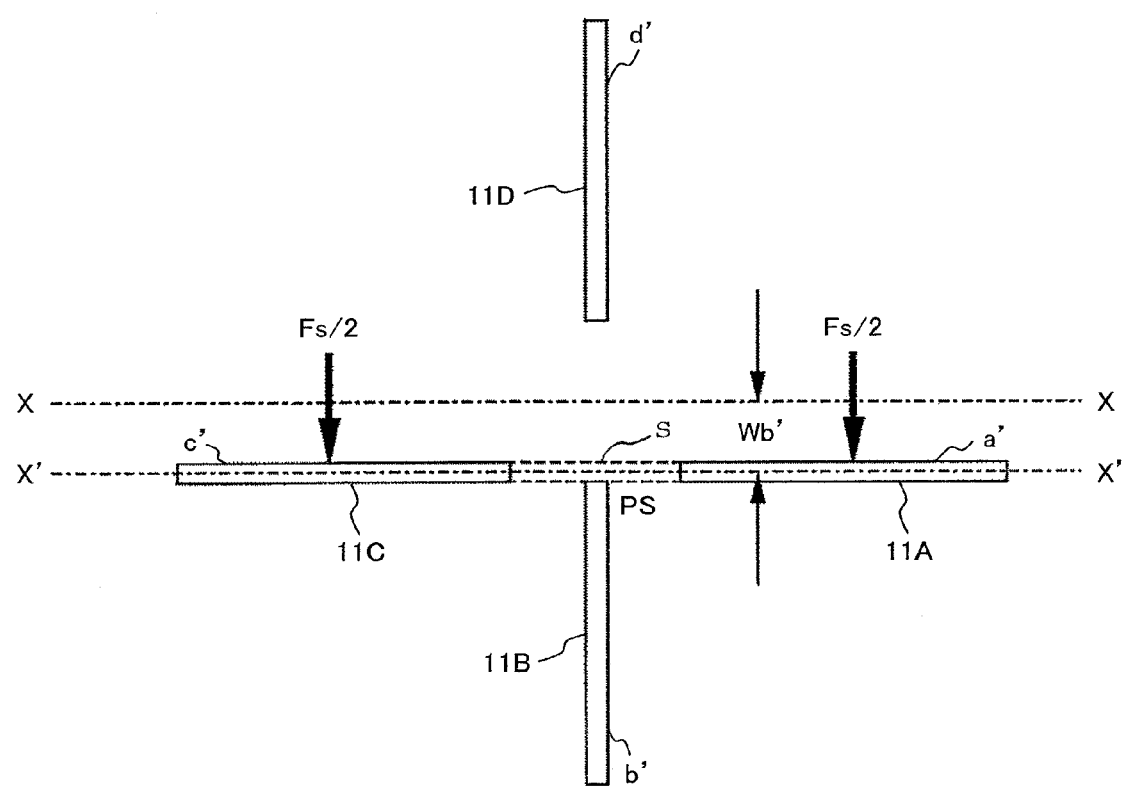
FIG. 12 is an explanatory drawing showing a displacement state of a structural element shown in FIG. 7, in which load Fs is added to blades a' and c' due to seismic deformation of fuel assemblies, and the blades a' and c' are deformed by only amount of width Wb'.

FIG. 12 shows the cross-section of the structural element 103 according to the present embodiment when the blades a' and c' are affected by horizontal seismic deformation of the fuel assemblies 2, and the control rod 100 is subject to the load that balances with the deformation. Since the blade b' comes in contact with the cross-link S at point PS, if horizontal deformation of the control rod 100 exceeds the width Wb' of the window 14A between the cross-link S and the blade b', the section secondary moment which has been nearly 0.002 in the united cruciform cross-section will effectively become the section secondary moment of the united cruciform cross-section.

Figure 13:
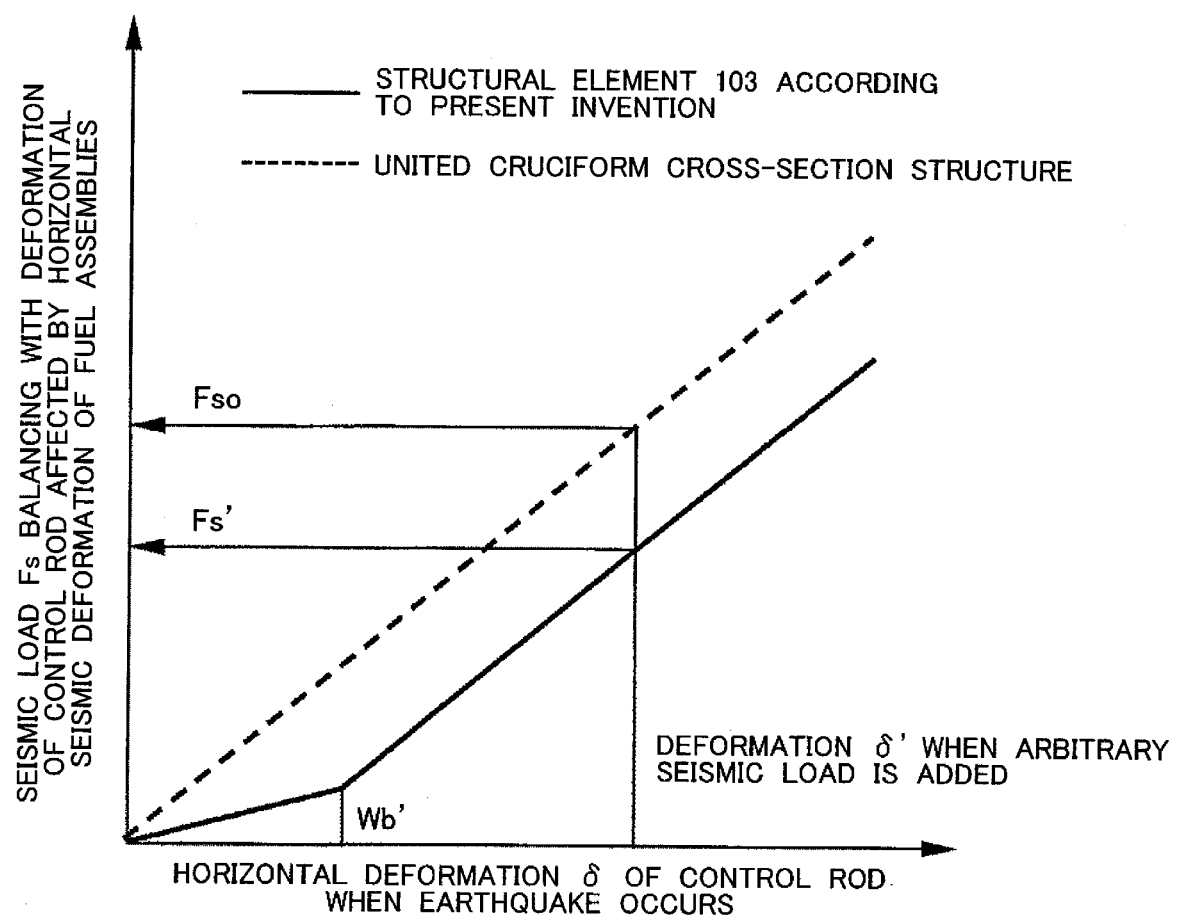
FIG. 13 is a characteristic drawing showing a relationship between horizontal deformation of a control rod when earthquake occurs and seismic load balancing with deformation of a control rod affected by horizontal seismic deformation of fuel assemblies.

FIG. 13 shows the relationship between the amount of deformation δ of the control rod affected by the horizontal seismic deformation of the fuel assemblies and the balanced seismic load Fs by comparing the example of the conventional structural element 400 (FIG. 22) having the united cruciform cross-section with the example of the structural element 103 according to the present embodiment, and also qualitatively shows the effects. Assuming that a build-up gradient of balanced load Fs with regard to the amount of deformation δ of the conventional control rod including the structural element 400 with the united cruciform cross-section is 1, in the structural element 103 of the control rod 100 according to the present embodiment, the build-up gradient is 0.002 up to the width Wb' of the window 14A provided at the center of the cruciform, however, the gradient after deformation Wb' becomes close to 1 in the same manner as the structure element 400 with the united cruciform cross-section because the blade b' comes come in contact with the cross-link S at the point PS in FIG. 12. As each characteristic is present, if deformation δ' of the control rod occurs due to arbitrary seismic motion, by applying the structural element 103 according to the present embodiment to the conventional united cruciform cross-section structure as shown in FIG. 13, a balanced load Fso of the structure element 400 can be reduced to a load Fs' of the structure element 103. FIG. 13 qualitatively shows the effects, and if the ratio of the width Wb' of the window 14A to the deformation δ' due to arbitrary seismic motion is small, significantly quantitative effects cannot be expected. However, assuming that the width Wb' of the window 14A can be almost equivalent to a width of the tie rod that fixes, at the center of the control rod, the sheath which is a thin-plate sheath member having a U-shaped cross-section and widely used in the existing boiling water reactors, the width Wb' becomes nearly one-third in terms of ratio to the maximum deformation of fuel assemblies currently expected in Japan. Since there is a certain gap between the fuel assemblies and the control rod depending on the arrangement in the core, horizontal deformation of the control rod when an earthquake occurs becomes smaller than the deformation of the fuel assemblies. Consequently, the ratio of the width Wb' of the window 14A to the amount of deformation δ' becomes one-third or more quantitatively, achieving significant effects.

Figure 14:
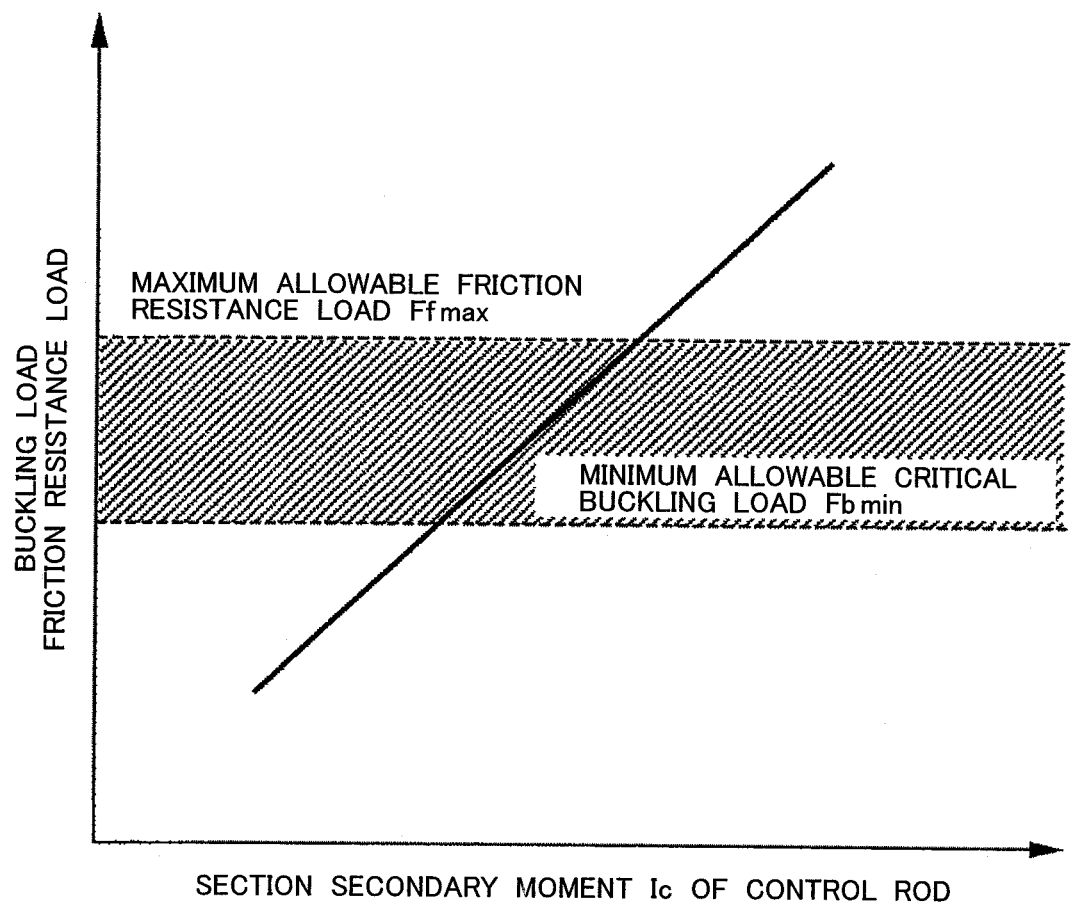
FIG. 14 is a characteristic drawing showing a relationship between the section secondary moment and the buckling load and friction resistance load.

When thus considering the functions of the control rod, if the effective section secondary moment is properly selected within a range of oblique line zone shown in FIG. 14 so that minimum allowable critical buckling load is higher than the compressive load at the scramming as shown in FIG. 14 and also friction resistance load exerted when the reaction force of the control rod that balances with the seismic deformation of the fuel assemblies is generated can be equivalent to or less than maximum allowable friction resistance load (maximum friction resistance load that can satisfy the control rod scramming time required when an earthquake occurs), it is possible to form the structural element 103 of the control rod 100 in FIG. 7 having good seismic scrammability as well as soundness to the scramming load even if the structural member is a rigid structure in order to enable the neutron absorber-holding structure having no gap to avoid creating a gap which is considered to be the cause of the degradation of the structural member of the control rod associated with the long-time use of the control rod.

According to the present embodiment, it is possible to provide a control rod structure which suppresses a decrease in seismic scrammability that is an important function of the control rod and achieves good scrammability if an extremely-large earthquake occurs even though the structural member is a rigid structure in order to enable the neutron absorber-holding structure having no gap to avoid creating a gap which is considered to be the cause of the degradation of the structural member of the control rod associated with the long-time use of the control rod.

With regard to other effects of the present embodiment, it is possible to provide a control rod structure which can suppress buckling deformation due to the axial compressive load generated at the scramming (quickly inserting the control rods into the core) which is a typical external force exerted on the control rod during the reactor operation as well as form a flexible structural member of the control rod that enables good seismic scrammability.

[Embodiment 2]

Figure 15:
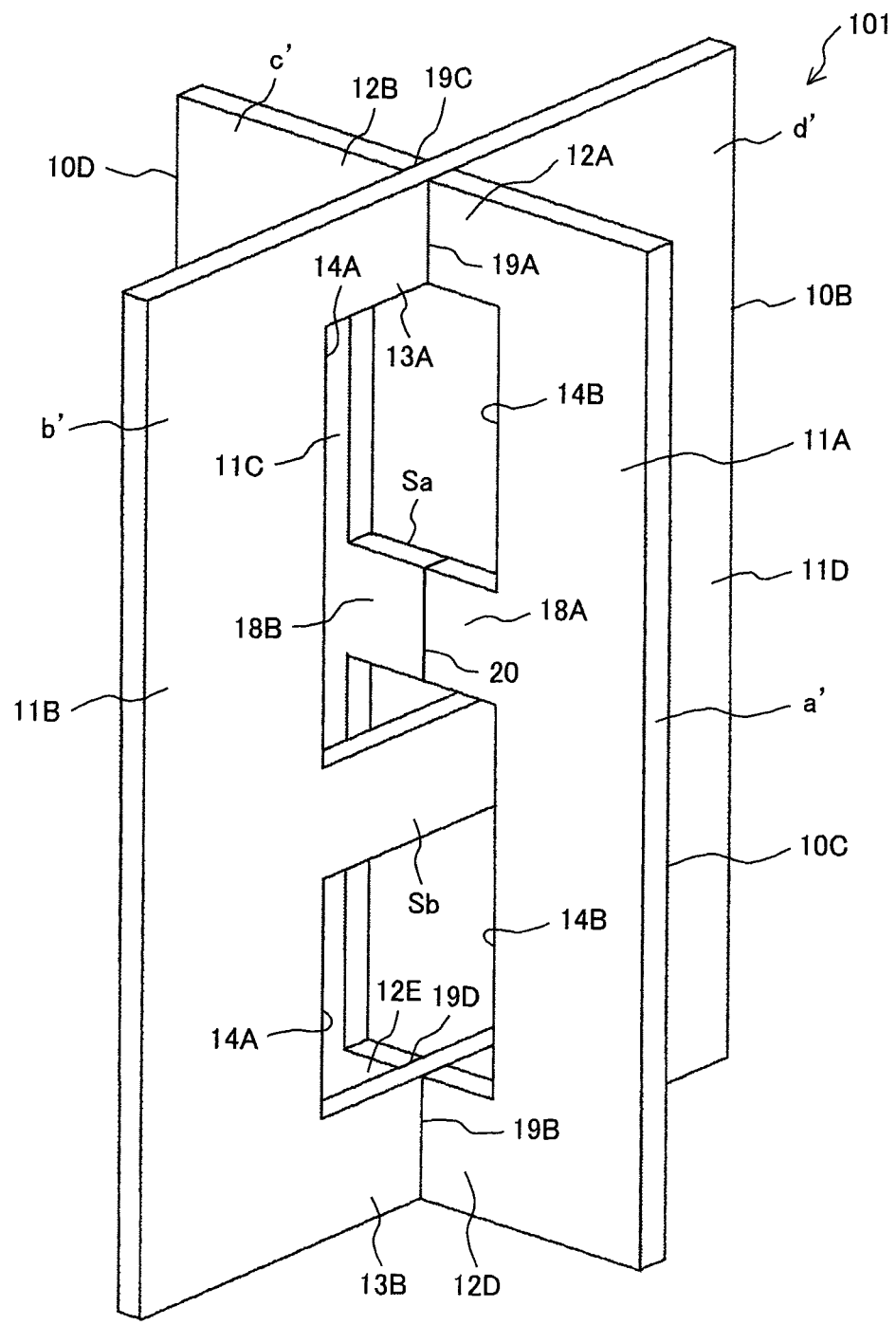
FIG. 15 is an enlarged perspective view showing a structural element of a control rod for a boiling water reactor according to Embodiment 2 which is another embodiment of the present invention.

A control rod for a boiling water reactor of embodiment 2 which is another embodiment of the present invention will be described with reference to FIG. 15. The control rod of the present embodiment has a structure that substitutes a structure element 101 for the structure element 103 in the control rod 100. The other structure of the structure element 101 is the same as the structure element 103.

The structure element 101 will be described in detail. The structure element 101 has three plate members 10B, 10C and 10D. The plate member 10B forms tow windows (opening portions) 14A and has connection portion 13A and 13B and a cross-link Sb. The plate member 10C has connection portion 12A, 12D and 18A. The plate member 10D has connection portion 12B, 12E and 18B. The plate member 10B forms the blades b' (90° blade) and d' (270° blade), the plate member 10C forms the blade a' (0° blade) and the plate member 10D forms the blade c' (180° blade). In the present embodiment, a width of the blades a', b', c' and d' is also WB, respectably (see FIG. 10).

The plate member 10C is disposed perpendicularly to one side of the plate member 10B and weld to the plate member 10B. The connection portion 12A of the plate member 10C is connected to the connection portion 13A of the plate member 10B by a weld portion 19A. The connection portion 12D of the plate member 10C is connected to the connection portion 13B of the plate member 10B by a weld portion 19B. The plate member 10D is also disposed perpendicularly to another side of the plate member 10B and weld to the plate member 10B. The connection portion 12B of the plate member 10D is connected to the connection portion 13A of the plate member 10B by a weld portion 19C. The connection portion 12E of the plate member 10D is connected to the connection portion 13B of the plate member 10B by a weld portion 19D.

The connection portion 18A of the plate member 10C is connected to the connection portion 18B by a welding portion 20 for forming a cross-link Sa. The cross-link Sa is disposed above the cross-link Sb. Two windows (opening portions) 14B are formed above the cross-link Sa and below the cross-link Sa in the plate members 10C and 10D.

The control rod of the present embodiment also has the first region having the first cross-section, the second region having the second cross-section and the third region having the third cross-section. A region disposing the connection portions 12A, 12B and 13A and a region disposing the connection portions 12D, 12E and 13B are the first region, respectively. A region disposing the cross-link Sa and a region disposing the cross-link Sb is the third region, respectively. A region forming between the region disposing the connection portions 12A, 12B and 13A being the first region and the region disposing the connection portions 12D, 12E and 13B being the first region exclusive of the third region is the second region. The third regions include a fourth region being the region disposing the cross-link Sa and a fifth region being the region disposing the cross-link Sb. The connection portions 12A, 12B and 13A, and the connection portions 12D, 12E and 13B is a cruciform connection member, respectively.

As with the structure element 103 being used in embodiment 1, in the structure element 101, the neutron absorber-filling portions 11A, 11B, 11C and 11D are formed in the blade a', b', c' and d'. The windows 14B are formed between the neutron absorber-filling portion 11A and the neutron absorber-filling portion 11C. The cross-link Sa is disposed in the window 14A and the cross-link Sb is disposed in the window 14B.

In the control rod of the present embodiment, the cross-links Sa and Sb are provided in the plate members 10C and 10D and the plate member 10B placing perpendicularly to the plate members 10C and 10D, respectively. The cross-link Sa is disposed in a direction of the blades a'-c' and the cross-link Sb is disposed in the direction of the blades b'-d'. In the fourth region of the present embodiment, a ratio of the measuring (distance) Wb' between the cross-link Sa and the blade b' to the width WB of the blade is 2/25 or less and a ratio of measuring (distance) Wd' between the cross-link Sa and the blade d' to the width WB of the blade is 2/25 or less. In the fifth region of the present embodiment, a ratio of the measuring (distance) Wa' between the cross-link Sb and the blade a' to the width WB of the blade is 2/25 or less and a ratio of the measuring (distance) Wc' between the cross-link Sb and the blade c' to the width WB of the blade is 2/25 or less. These ratio are also applied to later embodiments 3 and 4.

Therefore, the control rod having the structure element 101 has good seismic scrammability with regard to seismic motions both parallel and vertical to the horizontal cross-section of each blade. Furthermore, necessary neutron absorber can be held in the structural element 101 of the control rod, therefore, the control rod has high neutron absorbing effects.

In such a present embodiment, each effect attained in the embodiment 1 can be obtained. Further, according to the present embodiment, seismic scrammability with regard to seismic motions both parallel and vertical to the horizontal cross-section of each blade is good, and more neutron absorber can be included.

[Embodiment 3]

Figure 16:
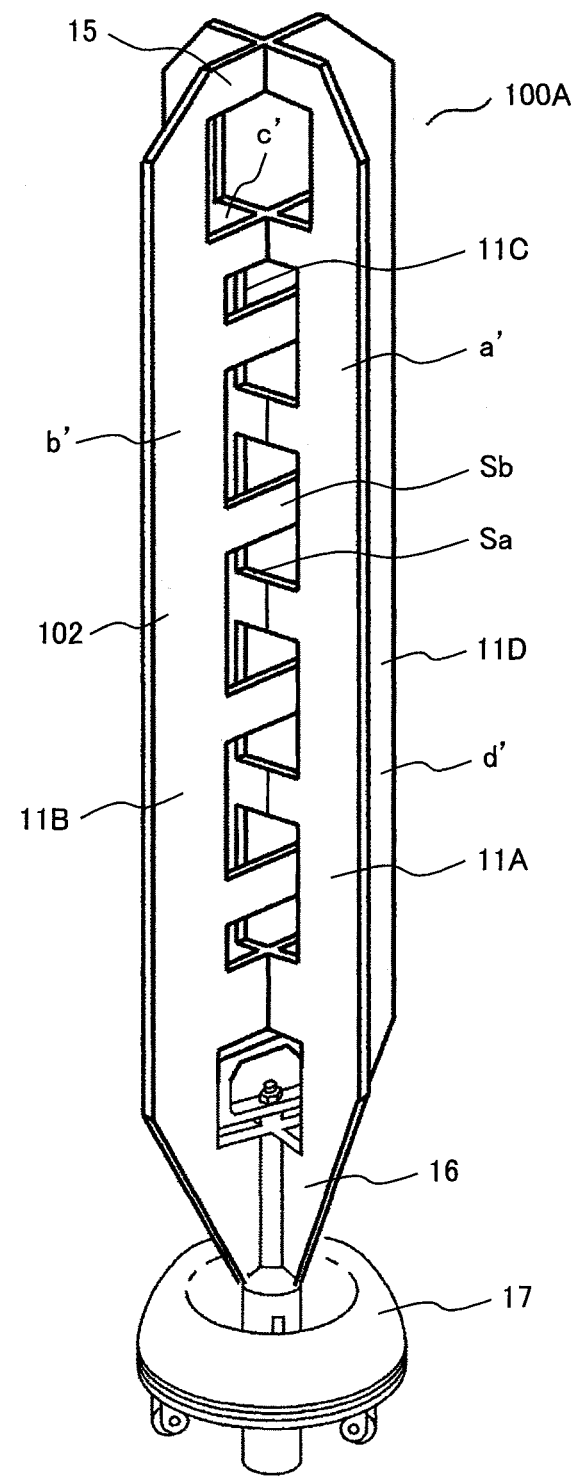
FIG. 16 is a perspective view showing a control rod for a boiling water reactor according to Embodiment 3 which is another embodiment of the present invention.
Figure 17:
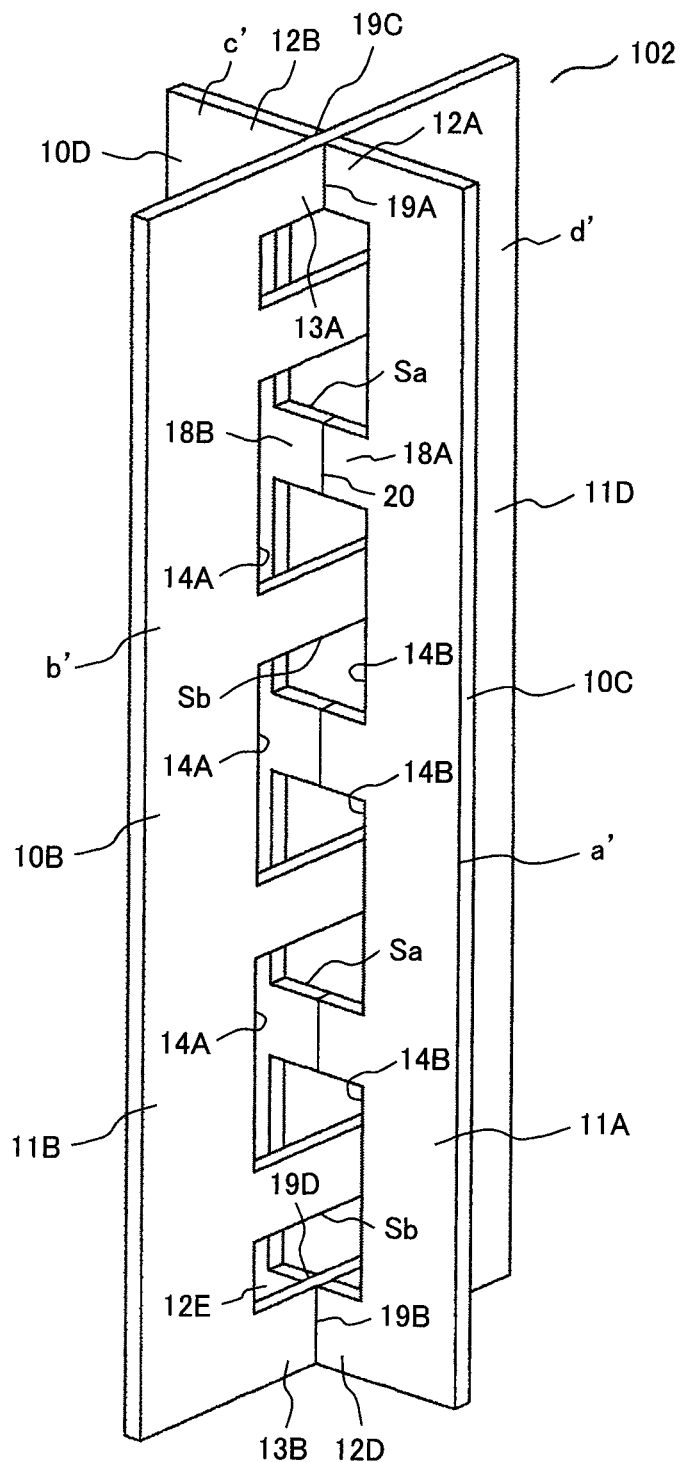
FIG. 17 is an enlarged perspective view showing a structural element of a control rod shown in FIG. 16.

A control rod for a boiling water reactor of embodiment 3 which is another embodiment of the present invention will be described with reference to FIGS. 16 and 17. The control rod 100A of the present embodiment has a structure that substitutes a structure element 102 for the structure element 101 in the control rod of the embodiment 2. The structure element 102 has a plurality of cross-links Sa (for example, three cross-links Sa) and a plurality of cross-links Sb (for example, four cross-links Sb). The other structure of the structure element 102 is the same as the structure element 101.

The structure element 101 has a plate members 10B that forms five windows (opening portions) 14A and has connection portion 13A and 13B and a plurality of cross-links Sb, a plate member 10C that has connection portions 12A and 12D and a plurality of connection portions 18A (for example, three connection portions 18A), and a plate member 10D that has connection portions 12B and 12E and a plurality of connection portions 18B (for example, three connection portions 18B).

As with the control rod of embodiment 2, the control rod 100A also has the first region having the first cross-section, the second region having the second cross-section and the third region having the third cross-section in the axis direction thereof. The third regions include a fourth region being the region disposing the cross-link Sa and a fifth region.

In the same manner as the structure element 101, the plate members 10C and 10D are welded to the plate member 10B. The plate member 10B forms the blades b' (90° blade) and d' (270° blade), the plate member 10C forms the blade a' (0° blade) and the plate member 10D forms the blade c' (180° blade). The plurality of cross-links Sa are formed by welding the connection portions 18A to the connection portions 18B and is disposed in a direction of the blades a'-c'. The cross-links Sb is disposed in the direction of the blades b'-d'. The control rod 100A has a plurality of windows 14A separated by the cross-links Sb and a plurality of windows 14B separated by the cross-links Sa. The cross-link Sa and Sb are alternately disposed in the axis direction of the control rod 100A. The cross-link Sa is disposed at a position some distance from the cross-link Sb in the axis direction of the control rod 100A.

The windows 14A include a plurality of windows 14A formed by being surrounded by the neutron absorber-filling portions 11B and 11D and two cross-links Sb, one window 14A formed by being surrounded by the neutron absorber-filling portions 11B and 11D, one cross-link Sb and the connection portion 13A, and one window 14A formed by being surrounded by the neutron absorber-filling portions 11B and 11D, one cross-link Sb and the connection portion 13B. The windows 14B include a plurality of windows 14B formed by being surrounded by the neutron absorber-filling portions 11A and 11C and two cross-links Sa, one window 14B formed by being surrounded by the neutron absorber-filling portions 11A and 11C, one cross-link Sa and the connection portions 12A and 1B, and one window 14B formed by being surrounded by the neutron absorber-filling portions 11A and 11C, one cross-link Sa and the connection portions 12D and 12E.

Since the control rod 100A also has the cross-links Sa and Sb, according to the present embodiment, it is possible to provide a structure having good seismic scrammability with regard to seismic motions both parallel and vertical to the horizontal cross-section of each blade. Furthermore, because necessary neutron absorber can be held in the structural element 102, the control rod has high neutron absorbing effects.

In such a present embodiment, each effect attained in the embodiment 2 can be obtained. Further, according to the present embodiment, seismic scrammability with regard to seismic motions both parallel and vertical to the horizontal cross-section of each blade is good, and more neutron absorber can be included.

[Embodiment 4]

Figure 18:
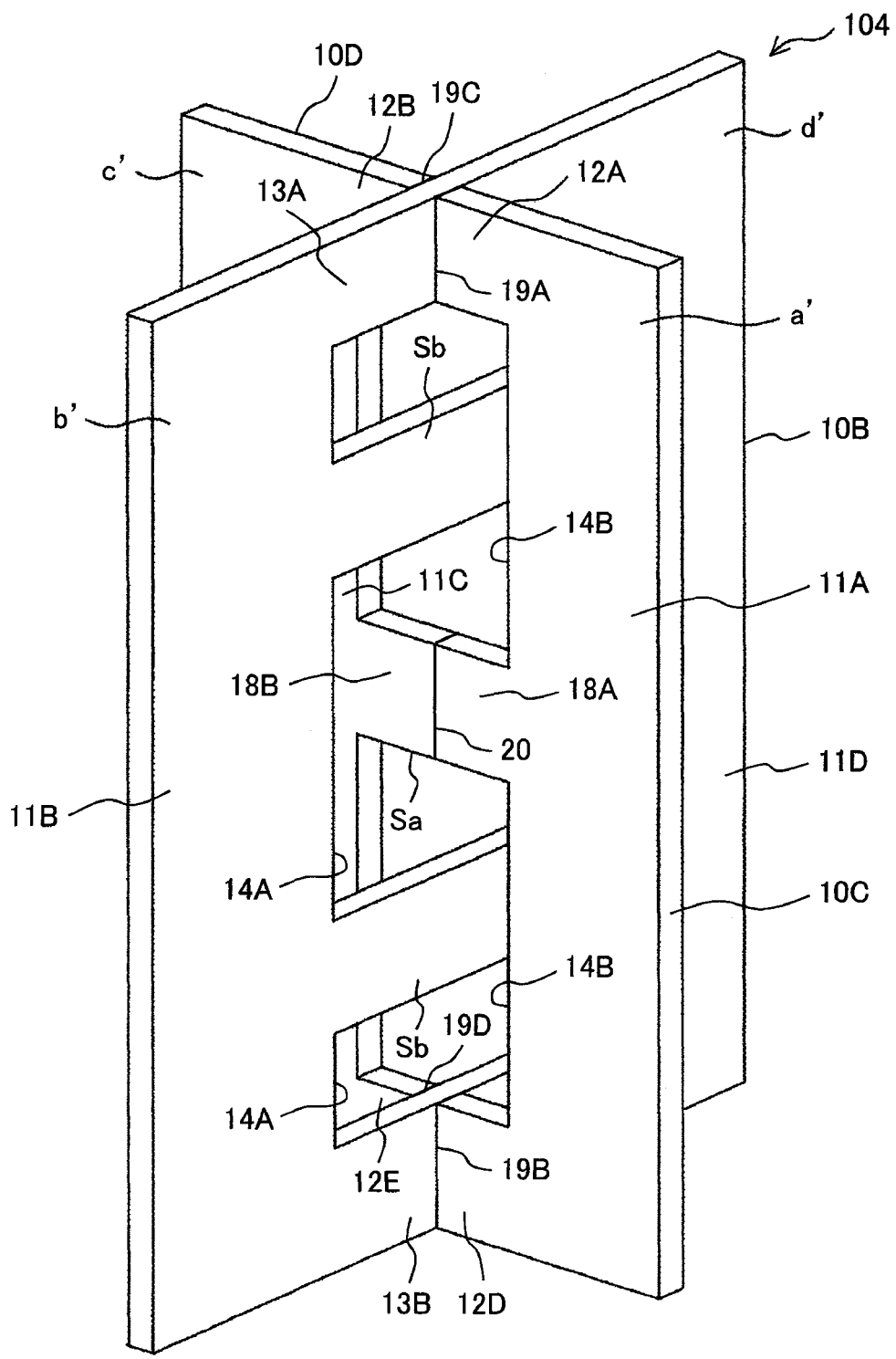
FIG. 18 is an enlarged perspective view showing a structural element of a control rod for a boiling water reactor according to Embodiment 4 which is another embodiment of the present invention.
Figure 19:
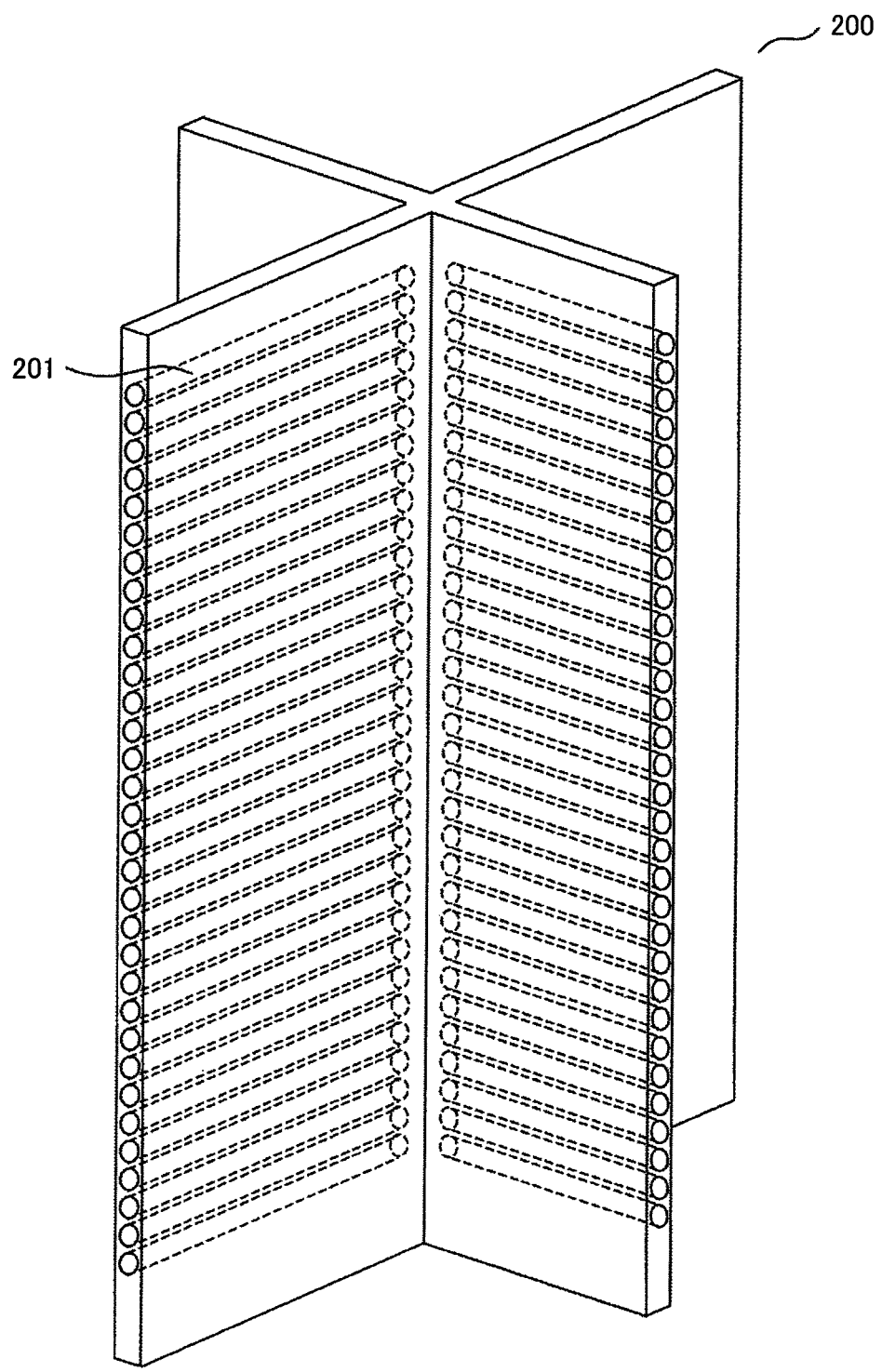
FIG. 19 is an enlarged perspective view showing a structural element of a conventional control rod for a boiling water reactor, having stainless-steel plates in which horizontal holes for holding neutron absorber member are formed.
Figure 20:
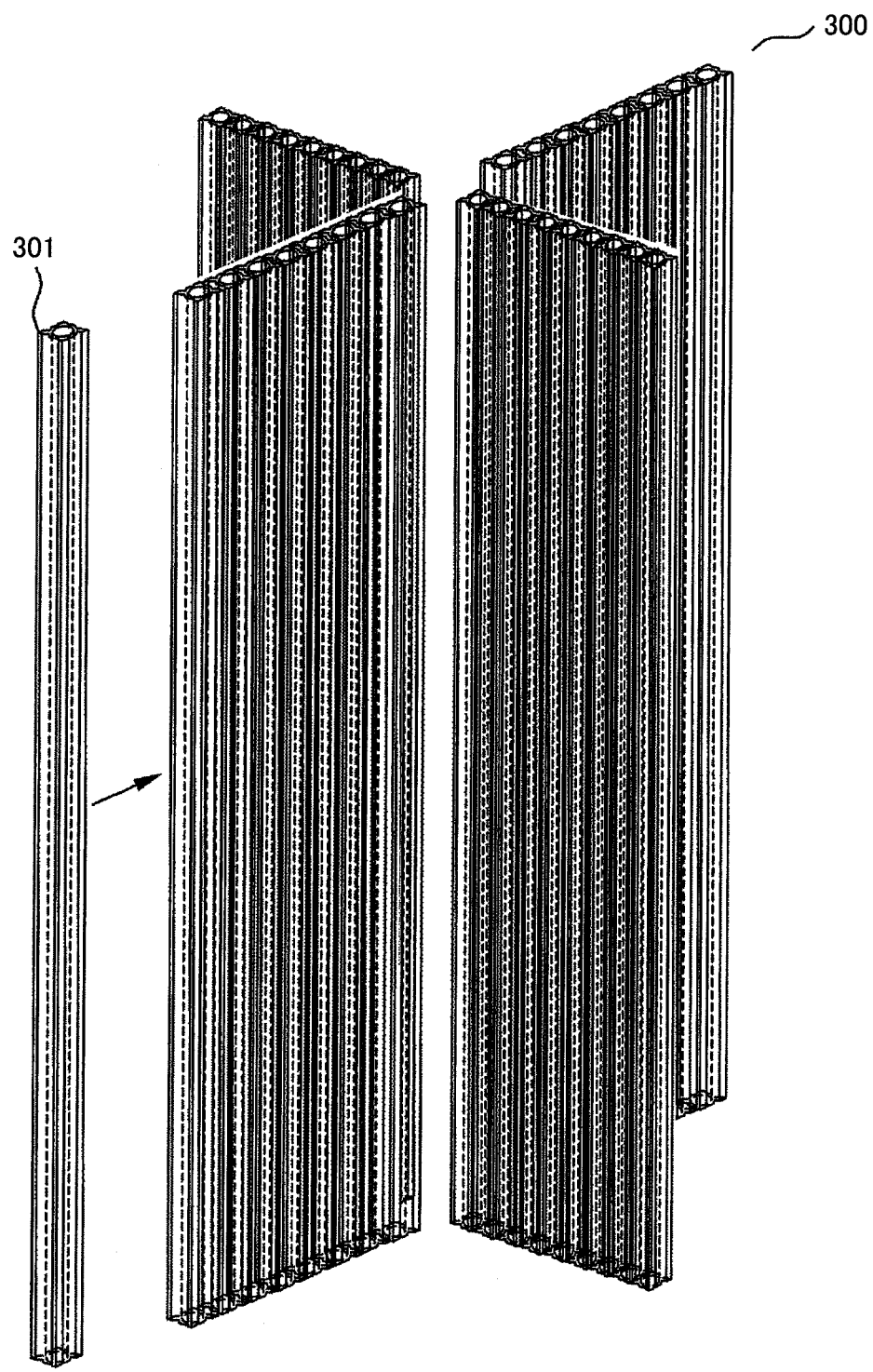
FIG. 20 is an enlarged perspective view showing a structural element of a conventional control rod for a boiling water reactor, having a plurality of tube members with a deformed cross-section including four corner lobes, for holding neutron absorber member and welding together the four corner square portions.

A control rod for a boiling water reactor of embodiment 4 which is another embodiment of the present invention will be described with reference to FIG. 18a. The control rod of the present embodiment has a structure that substitutes a structure element 104 for the structure element 102 in the control rod 100A of the embodiment 3. The structure element 104 has one cross-links Sa and two cross-links Sb. The other structure of the structure element 104 is the same as the structure element 102.

In such a present embodiment, each effect attained in the embodiment 2 can be obtained. Further, according to the present embodiment, seismic scrammability with regard to seismic motions both parallel and vertical to the horizontal cross-section of each blade is good, and more neutron absorber can be included. Thus, effective neutron absorbing capability of the control rod can be expected.

Industrial Applicability

The present invention can be applied to the control rod used in the reactor.

Reference Signs List 10A, 14B, 10C, 10D: plate member, 11A, 11B, 11C, 11D: neutron absorber-filling portion, 12A, 12B, 12C, 12D, 12E, 13A, 13B, 18A, 18B: connection portion, 14A,14B: window, 100, 100A: control rod, 101, 102, 103, 104: structure element, a', b', c', d': blade, S, Sa, Sb; cross-link.

What is claimed is:

1. A control rod for a boiling water reactor comprising:
a structure element;
a handle mounted to an upper end potion of the structural element; and
a lower support member mounted to a lower end portion of the structure element;
wherein the structure element includes four blades having a neutron absorber-filling region in which neutron absorber is held, respectively, and the four blades are disposed perpendicularly to one another;
wherein the structure element has a plurality of regions formed in an axial direction of the control rod, the plurality of regions including a first region having a first cross-section that forms a first united cruciform cross-section of the four blades connected to one another, a second region having a second cross-section that has each separated cross-section of the four blades, and a third region having a third cross-section that has a second united cross-section of continuous two blades, which are disposed in a diametrically opposite direction of the four blades, and each separated cross-section of remaining two blades, which are disposed in a diametrically opposite direction and disposed perpendicularly to the continuous two blades, of the four blades;
wherein the first region is formed in a first end portion of a handle side of the structure element and a second end portion of a lower support member side of the structure element, respectively;
wherein the third region is formed between the first region formed in the first end portion and another first region formed in the second end portion; and
wherein the second region is formed between the first region formed in the first end portion and another first region formed in the second end portion exclusive of the third region.

2. The control rod for a boiling water reactor according to claim 1, wherein the structure element has plate members disposed perpendicularly to each other and connected to each other; the first, second and third regions are formed in the plate members; and the plate members includes the neutron absorber-filling regions of the four blades.

3. The control rod for a boiling water reactor according to claim 1, wherein in a second region, a first opening portion is formed between two first blades, which are disposed in the diametrically opposite direction, of the four blades, and a second opening portion is formed between two second blades, which are disposed in the diametrically opposite direction and disposed perpendicularly to the first blade, of the four blades, and in the third region, the second united cross-section is disposed in either the first or second opening portion.

4. The control rod for a boiling water reactor according to claim 3, wherein the first regions include a cruciform connection member that connects the four blades to one another; the third region include a cross-link member that is connects to the two blades included in the continuous two blades; and in the third region, the cross-link member is disposed in the second opening portion.

5. The control rod for a boiling water reactor according to claim 4, wherein in the third region, a ratio of a distance between the cross-link member and the blade disposed perpendicularly to the cross-link member to a width of the third blade is 2/25 or less.

6. The control rod for a boiling water reactor according to claim 1, wherein the four blades include a first blade and a second blade, and a third blade and a fourth blade disposed perpendicularly to the first and second blade; the first and second blades are disposed in a diametrically opposite direction and facing each other; the third and fourth blades are disposed in a diametrically opposite direction and facing each other; and the first cross-section of the first region, the second cross-section of the second region and the third cross-section of the third region include each cross-section of the first, second, third and fourth blades, respectively.

7. The control rod for a boiling water reactor according to claim 6, wherein in the second region, a first opening portion is formed between the first blade and the second blade and a second opening portion is formed between the third blade and the fourth blade; and in the third region, either the first or second opening portion is formed between the remaining two blades.

8. The control rod for a boiling water reactor according to claim 7, wherein the first regions include a cruciform connection member that connects the first, second, third and fourth blades to one another; the cross-link members include a first cross-link member and a second cross-link member; the third regions include a fourth region having the first cross-link member that connects the first and second blades to each other and a fifth region having the second cross-link member that connects the third and fourth blades to each other; the first cross-link member is disposed above the second cross-link member; the fourth region includes a fourth united cross-section, which has a cross-section of the first cross-link member and cross-sections of the first and second blades being the continuous two blades and each separated cross-section of the third and fourth blades, being the second united cross-section; and the fifth region includes a fifth united cross-section, which has a cross-section of the second cross-link member and cross-sections of the third and fourth blades being another continuous two blades and each separated cross-section of the first and second blades, being the second united cross-section.

9. The control rod for a boiling water reactor according to claim 8, wherein in the fourth region, the first opening portion is formed between the first blade and the second cross-link member and between the second blade and the second cross-link member, respectively; and in the fifth region, the second opening portion is formed between the third blade and the first cross-link member and between the fourth blade and the first cross-link member, respectively.

10. The control rod for a boiling water reactor according to claim 8, wherein in the fourth region, a ratio of a distance between the first cross-link member and the third blade to a width of the blade is 2/25 or less and a ratio of a distance between the first cross-link member and the fourth blade to the width of the blade is 2/25 or less; and fifth region, a ratio of a distance between the second cross-link member and the first blade to the width of the blade is 2/25 or less and a ratio of a distance between the second cross-link member and the second blade to the width of the blade is 2/25 or less.

11. The control rod for a boiling water reactor according to claim 1, wherein the third region includes a cross-link member connecting each of the two blades in the second united cross-section of the continuous two blades and an opening is formed between the cross-link member and each of the two blades in the each separated cross-section of the third region.

* * * * *